US012665186B2

(12) United States Patent
Kim et al.

(10) Patent No.: US 12,665,186 B2
(45) Date of Patent: Jun. 23, 2026

(54) ALL-SOLID SECONDARY BATTERY AND METHOD OF MANUFACTURING ALL-SOLID SECONDARY BATTERY

(71) Applicant: Samsung Electronics Co., Ltd., Suwon-si (KR)

(72) Inventors: Sewon Kim, Suwon-si (KR); Jusik Kim, Hwaseong-si (KR); Hyeokjo Gwon, Hwaseong-si (KR); Ryounghee Kim, Uiwang-si (KR); Hyunseok Kim, Suwon-si (KR); Sungkyun Jung, Suwon-si (KR); Changhoon Jung, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 630 days.

(21) Appl. No.: 17/075,059

(22) Filed: Oct. 20, 2020

(65) Prior Publication Data

US 2021/0119203 A1     Apr. 22, 2021

(30) Foreign Application Priority Data

Oct. 22, 2019   (KR) ........................ 10-2019-0131388
Mar. 11, 2020   (KR) ........................ 10-2020-0030377

(51) Int. Cl.
*H01M 4/36*     (2006.01)
*H01M 4/38*     (2006.01)
(Continued)

(52) U.S. Cl.
CPC ............. *H01M 4/366* (2013.01); *H01M 4/38* (2013.01); *H01M 10/0525* (2013.01);
(Continued)

(58) Field of Classification Search
CPC ........ H01M 4/134; H01M 4/366; H01M 4/38; H01M 10/056; H01M 10/0561;
(Continued)

(56) References Cited

U.S. PATENT DOCUMENTS 6,402,795 B1     6/2002   Chu et al.
6,485,622 B1    11/2002   Fu
(Continued)

FOREIGN PATENT DOCUMENTS

CN        104364956 A      2/2015
EP         3376572 A1      2/2018
(Continued)

OTHER PUBLICATIONS

Chih-Long Tsai, et al., "Li7La3Zr2O12 Interface Modification for Li Dendrite Prevention," Applied Materials & Interfaces, Mar. 31, 2016, vol. 8, pp. 10617-10626.
(Continued)

*Primary Examiner* — Jeremiah R Smith
(74) *Attorney, Agent, or Firm* — CANTOR COLBURN LLP

(57)                ABSTRACT

An all-solid secondary battery including: a cathode layer including a cathode active material; an anode layer; and a solid electrolyte layer including a solid electrolyte disposed between the cathode layer and the anode layer, wherein the anode layer includes an anode current collector, a first anode active material layer in contact with the solid electrolyte layer, and a second anode active material layer disposed between the anode current collector and the first anode active material layer, wherein the first anode active material layer includes a first metal and has a lithium-ion reduction potential greater than a reduction potential of the solid electrolyte, and wherein the second anode active material layer includes a second metal, and a solid solubility of
(Continued)

lithium (Li) in the second metal is greater than a solid solubility of lithium in the first metal.

29 Claims, 11 Drawing Sheets

(51) Int. Cl.
*H01M 10/0525* (2010.01)
*H01M 10/0562* (2010.01)
*H01M 4/02* (2006.01)

(52) U.S. Cl.
CPC .. *H01M 10/0562* (2013.01); *H01M 2004/021* (2013.01); *H01M 2004/027* (2013.01); *H01M 2300/0071* (2013.01)

(58) Field of Classification Search
CPC ..... H01M 10/0562; H01M 2300/0068; H01M 10/052; H01M 10/0525
See application file for complete search history.

(56) References Cited

U.S. PATENT DOCUMENTS

| | | | |
|---|---|---|---|
| 7,901,658 | B2 | 3/2011 | Weppner |
| 8,828,580 | B2 | 9/2014 | Visco et al. |
| 9,484,596 | B2 | 11/2016 | Otomo et al. |
| 10,128,533 | B2 | 11/2018 | Yamamoto et al. |
| 10,168,389 | B2 | 1/2019 | Fujiki et al. |
| 10,862,160 | B2 | 12/2020 | Michibata et al. |
| 2003/0049532 | A1* | 3/2003 | Kurokawa ........ H01M 50/1243 |
| | | | 429/232 |
| 2011/0081580 | A1* | 4/2011 | Stadler .............. H01M 10/0562 |
| | | | 429/319 |
| 2012/0208092 | A1 | 8/2012 | Ku et al. |
| 2015/0044560 | A1* | 2/2015 | Ogino ................... H01M 4/625 |
| | | | 427/122 |
| 2015/0325843 | A1 | 11/2015 | Yoon et al. |
| 2018/0006326 | A1 | 1/2018 | O'Neill et al. |
| 2018/0123181 | A1 | 5/2018 | Son et al. |
| 2018/0226633 | A1 | 8/2018 | Fujiki et al. |
| 2018/0248201 | A1 | 8/2018 | Shimoda et al. |
| 2019/0088986 | A1 | 3/2019 | Hu et al. |
| 2019/0157723 | A1 | 5/2019 | Suzuki et al. |
| 2020/0075990 | A1 | 3/2020 | Park et al. |
| 2020/0152975 | A1* | 5/2020 | Archer .............. H01M 10/0567 |
| 2020/0395618 | A1* | 12/2020 | Rangasamy .......... H01M 4/382 |
| 2021/0408523 | A1 | 12/2021 | Fujiki et al. |
| 2024/0047761 | A1 | 2/2024 | Suzuki et al. |

FOREIGN PATENT DOCUMENTS

| | | | |
|---|---|---|---|
| JP | 2009093968 | A | 4/2009 |
| JP | 2017168434 | A | 9/2017 |
| JP | 2018129159 | A | 8/2018 |
| JP | 2018142432 | A | 9/2018 |
| JP | 2019096610 | A | 6/2019 |
| JP | 2019149298 | A | 9/2019 |
| JP | 2019179604 | A | 10/2019 |
| KR | 100669338 | B1 | 1/2007 |
| KR | 1020110017145 | A | 2/2011 |
| KR | 1020180138548 | A | 12/2018 |
| WO | 2015146315 | A1 | 10/2015 |
| WO | 2017006591 | A1 | 1/2017 |
| WO | 2018025594 | A1 | 2/2018 |

OTHER PUBLICATIONS

Fudong Han, et al., "Electrochemical Stability of Li10GeP2S12 and Li7La3Zr2O12 Solid Electrolytes," Adv. Energy Mater., Jan. 21, 2016, 6, 1501590, pp. 1-9.

Kun (Kelvin) Fu, et al., "Toward garnet electrolyte-based Li metal batteries: An ultrathin, highly effective, artificial solid-state electrolyte/metallic Li interface," Science Advances, Research Article, Apr. 7, 2017, 3: e1601659, pp. 1-11.

Kun (Kelvin) Fu, et al., "Transient Behavior of the Metal Interface in Lithium Metal-Garnet Batteries," Angew. Chem. Int. Ed., 2017, vol. 56, pp. 14942-14947.

William Manalastas Jr. et al., "Mechanical failure of garnet electrolytes during Li electrodeposition observed by in-operando microscopy," Journal of Power Sources, 412 (2019), pp. 287-293.

Yisi Zhu et al., "Dopant-Dependent Stability of Garnet Solid Electrolyte Interfaces with Lithium Metal," Adv. Energy Mater., 2019, 1803440, pp. 1-11.

Wei Luo, et al., "Reducing Interfacial Resistance between Garnet-Structured Solid-State Electrolyte and Li-Metal Anode by a Germanium Layer," Adv. Mater., Apr. 18, 2017, 29, 1606042, pp. 1-7.

European Search Report for European Patent Application No. 20202824.7 dated Mar. 5, 2021.

Santhosha et al., "The Indium-Lithium Electrode in Solid-State Lithium-Ion Batteries: Phase Formation, Redox Potentials, and Interface Stability," Batteries & Supercaps, 2019, 2, 524-529.

Zhu et al., "Origin of Outstanding Stability in the Lithium Solid Electrolyte Materials: Insights from Thermodynamic Analyses Based on First-Principle Calculations", ACS Appl. Mater. Interfaces, 2015, 7, 23685-23693.

Kato et al., "Enhancing utilization of lithium metal electrodes in all-solid-state batteries by interface modification with gold thin films", Journal of Power Sources, 309, 2016, 27-32.

Kato et al., "XPS and SEM analysis between Li/Li3PS4 interface with Au thin film for all-solid-state lithium batteries", Solid State Ionics, 322, 2018, 1-4.

English Language Translation of Office Action dated Oct. 15, 2024, issued in corresponding JP Patent Application No. 2020-176634, 4 pp.

Office Action dated Oct. 15, 2024, issued in corresponding JP Patent Application No. 2020-176634, 4 pp.

Office Action issued Nov. 13, 2024, in corresponding CN Patent Application No. 202011138229.3, 7 pp.

English Language Translation of Office Action issued Nov. 13, 2024, in corresponding CN Patent Application No. 202011138229.3, 8 pp.

* cited by examiner

1

ALL-SOLID SECONDARY BATTERY AND METHOD OF MANUFACTURING ALL-SOLID SECONDARY BATTERY

CROSS-REFERENCE TO RELATED APPLICATION

This application claims priority to and the benefit of Korean Patent Application No. 10-2019-0131388, filed on Oct. 22, 2019, and Korean Patent Application No. 10-2020-0030377, filed on Mar. 11, 2020, and all the benefits accruing therefrom under 35 U.S.C. § 119, the contents of which are incorporated herein in their entirety by reference.

BACKGROUND

1. Field

The present disclosure relates to an all-solid secondary battery and a method of manufacturing the all-solid secondary battery.

2. Description of the Related Art

Recently, batteries having high energy density and high safety have been actively developed in accordance with industrial requirements. For example, lithium ion batteries have been commercially available for the automotive field as well as in the fields of information-associated equipment and communication equipment. In the automotive field, safety of batteries is particularly important due to its association with life.

A currently commercially available lithium ion battery uses a liquid electrolyte including a flammable organic solvent, and thus there is a risk of overheating and fire when a short-circuit occurs. Accordingly, an all-solid battery using a solid electrolyte instead of such a liquid electrolyte has been suggested.

An all-solid battery can avoid use of a flammable organic solvent, having a reduced risk of fire or explosion even when a short-circuit occurs. Accordingly, the all-solid battery may have increased safety as compared with a lithium ion battery using a liquid electrolyte. Nonetheless, there remains a need for improved all-sold battery materials.

SUMMARY

Provided is an all-solid secondary battery having a structure to prevent a short-circuit during charge and discharge and having improved cycle characteristics.

Additional aspects will be set forth in part in the description which follows and, in part, will be apparent from the description, or may be learned by practice of the presented embodiments.

According to an aspect, there is provided an all-solid secondary battery including:

a cathode layer including a cathode active material;

an anode layer; and a solid electrolyte layer including a solid electrolyte and disposed between the cathode layer and the anode layer, wherein the anode layer includes an anode current collector, a first anode active material layer in contact with the solid electrolyte layer, and a second anode active material layer disposed between the anode current collector and the first anode active material layer,

2 wherein the first anode active material layer includes a first metal and has a lithium-ion reduction potential greater than a reduction potential of the solid electrolyte, and wherein the second anode active material layer includes a second metal, and a solid solubility of lithium in the second metal is greater than a solid solubility of lithium in the first metal.

According to another aspect, there is provided a method of manufacturing an all-solid secondary battery, the method including:

providing a solid electrolyte layer;

disposing a first anode active material layer on a surface of the solid electrolyte layer, wherein the first anode active material layer includes a first metal;

disposing a second anode active material layer on the first anode active material layer, wherein the second anode active material layer includes a second metal; and disposing a cathode active material layer on a surface of the solid electrolyte layer opposite the first anode active material layer to manufacture the all-solid secondary battery.

Also disclosed is a protected electrode including: a current collector; a first layer; a second layer disposed between the current collector and the first layer; and a solid electrolyte, wherein the first layer comprises a first metal and has a lithium-ion reduction potential greater than a reduction potential of the solid electrolyte, and wherein the second layer comprises a second metal, and a solid solubility of lithium in the second metal is greater than a solid solubility of lithium in the first metal.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
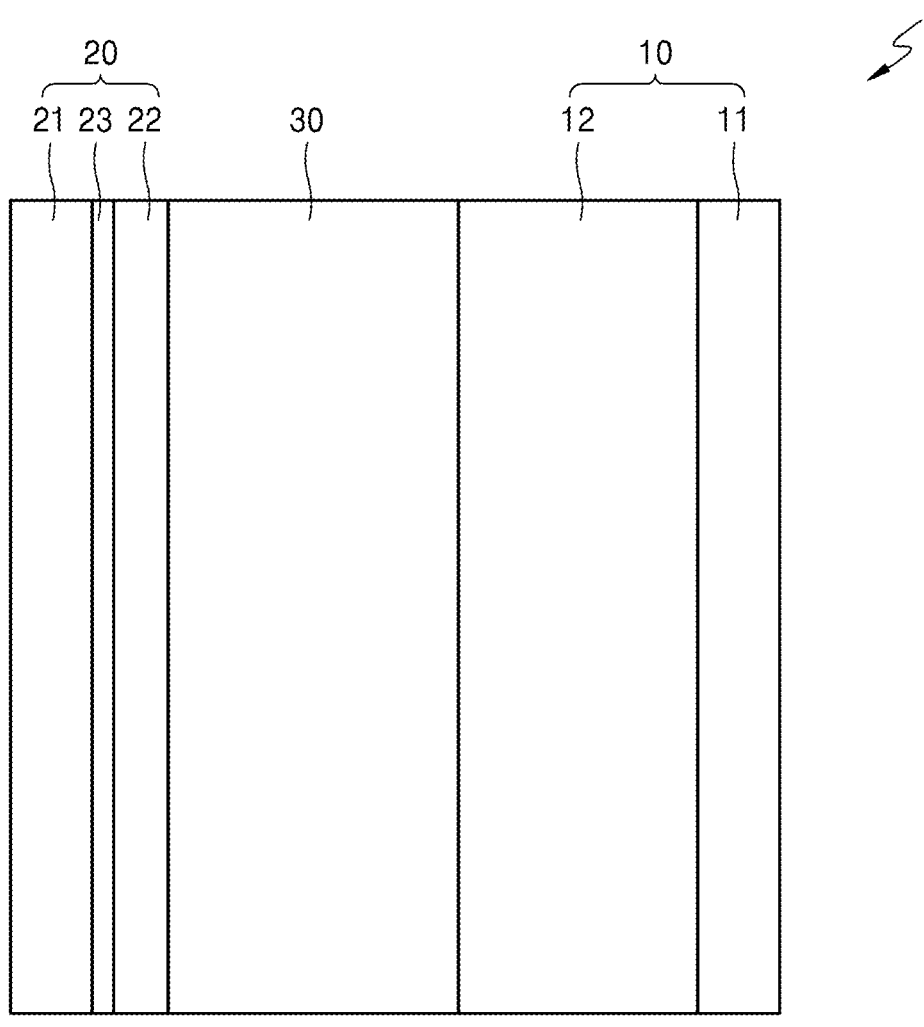
FIG. 1 is a cross-sectional view of an all-solid secondary battery according to an embodiment.

In an all-solid secondary battery using a solid electrolyte, lithium can be locally deposited in the interface between a solid electrolyte layer and an anode layer. While not wanting to be bound by theory, it is understood that the deposited lithium may grow inhomogeneously and consequentially pass through the solid electrolyte layer, causing a short-circuit in the battery. In addition, as metal ions, which are present in the solid electrolyte, undergo reduction in the interface between the solid electrolyte layer and the anode layer, decomposition of the solid electrolyte may proceed, resulting in generation and growth of conductors in the solid electrolyte layer. These conductors are understood to also cause a short-circuit in the battery.

An aspect is to provide an all-solid secondary battery preventing a short-circuit during charging and discharging, and having improved cycle characteristics.

The present disclosure will now be described more fully with reference to the accompanying drawings, in which example embodiments are shown. The present disclosure may, however, be embodied in many different forms, should not be construed as being limited to the embodiments set forth herein, and should be construed as including all modifications, equivalents, and alternatives within the scope of the present disclosure; rather, these embodiments are provided so that this disclosure will be thorough and complete, and will fully convey the effects and features of the present disclosure and ways to implement the disclosure to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

The terminology used herein is for the purpose of describing particular embodiments only and is not intended to be limiting of the present disclosure. As used herein, "a," "an," "the," and "at least one" do not denote a limitation of quantity and are intended to cover both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the slash "/" or the term "and/or" includes any and all combinations of one or more of the associated listed items.

In the drawings, the size or thickness of each layer, region, or element are arbitrarily exaggerated or reduced for better understanding or ease of description, and thus the present disclosure is not limited thereto. Throughout the written description and drawings, like reference numbers and labels will be used to denote like or similar elements. It will also be understood that when an element such as a layer, a film, a region or a component is referred to as being "on" another layer or element, it can be "directly on" the other layer or element, or intervening layers, regions, or components may also be present. Although the terms "first", "second", etc., may be used herein to describe various elements, components, regions, and/or layers, these elements, components, regions, and/or layers should not be limited by these terms. These terms are used only to distinguish one component from another, not for purposes of limitation. In the following description and drawings, constituent elements having substantially the same functional constitutions are assigned like reference numerals and overlapping descriptions will be omitted.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Argyrodite-type" or "argyrodite structure" as used herein means that the compound has a crystal structure isostructural with argyrodite, $Ag_8GeS_6$.

As used herein, the term "thin" in the context of a thin film has a thickness of 1 nanometer to 100 micrometers. As used herein, the term "the first metal" and "the second metal" include both a metal and a metalloid.

Hereinafter, example embodiments of an all-solid secondary battery and a method of manufacturing an all-solid secondary battery will be described in greater detail.

According to an embodiment, an all-solid secondary battery comprises: a cathode layer comprising a cathode active material; an anode layer; and a solid electrolyte layer comprising a solid electrolyte and disposed between the cathode layer and the anode layer, wherein the anode layer comprises an anode current collector, a first anode active material layer in contact with the solid electrolyte layer, and a second anode active material layer disposed between the anode current collector and the first anode active material layer, wherein the first anode active material layer comprises a first metal, and wherein the second anode active material layer comprises a second metal. According to an embodiment, an all-solid secondary battery comprises: a cathode layer comprising a cathode active material; an anode layer; and a solid electrolyte layer comprising a solid electrolyte and disposed between the cathode layer and the anode layer, wherein the anode layer comprises an anode current collector, a first anode active material layer in contact with the solid electrolyte layer, and a second anode active material layer disposed between the anode current collector and the first anode active material layer, wherein the first anode active material layer comprises a first metal and has a lithium-ion reduction potential greater than a reduction potential of the solid electrolyte, and wherein the second anode active material layer comprises a second metal, and a solid solubility of lithium (Li) in the second metal is greater than a solid solubility of lithium in the first metal.

While not wanting to be bound by theory, it is understood that because the lithium-ion reduction potential during charging of the first metal included in the first anode active material layer is greater than a reduction potential of the solid electrolyte, a reductive decomposition reaction of the solid electrolyte is suppressed. In addition, because a solid solubility of Li in the second metal is greater than a solid solubility of Li in the first metal, the lithium introduced into the first anode active material layer may be more easily dissolved into the second anode active material layer. Thus, decomposition of the solid electrolyte in the interface between the solid electrolyte layer and the first anode active material layer may be suppressed, and at the same time local deposition of lithium may also be suppressed, resulting in a lithium deposition layer having a uniform surface. Consequentially, during charge and discharge processes, the stability of the solid electrolyte layer may be improved and reversible deposition and/or dissolution of the lithium layer may be facilitated. While not wanting to be bound by theory, it is understood that more facile dissolution of the lithium layer results in suppression of a structure which would otherwise result in a short-circuit of the all-solid secondary battery, and cycle characteristics may be improved.

The "lithium-ion reduction potential" of the first metal is a potential at which lithium ions form a lithium-first metal alloy, such as a solid solution. In an aspect, the lithium-ion reduction potential of the first metal is a potential of the first metal during charge of the battery. Indium (In) metal may have a lithium-ion reduction potential of about 0.6 volts (V) vs. Li. Magnesium (Mg) metal may have a lithium-ion reduction potential of about 0.02 V vs. Li. The "lithium-ion reduction potential" of the first anode active material layer is a potential at which lithium ions form a lithium-first anode active material alloy, such as a solid solution.

The "reduction potential of the solid electrolyte" is a potential at which a transition metal included in the solid electrolyte is reduced. While not wanting to be bound by theory, it is understood that reduction of the transition metal of the solid electrolyte indicates decomposition of the solid electrolyte. The term "reduction potential of the solid electrolyte" can be expressed differently as a reductive decomposition potential of the solid electrolyte or a decomposition potential of the solid electrolyte. For example, a reduction potential of $Li_7La_3Zr_2O_{12}$ (LLZO) may be about 0.05 V vs. Li, e.g., about 0.01 V to about 0.1 V Li/Li$^+$.

The term "solid solubility of lithium in the first metal" means the maximum amount of lithium which can dissolve in the first metal to form a solid solution therewith without formation of separate phase. For example, in a lithium-indium alloy, the amount of lithium which indium can dissolve at 25° C. may be less than about 2 atomic percent (at %) based on total atom numbers of the lithium-indium alloy. When the amount of lithium is 2 at % or greater, a separate phase, such as LiIn may be formed. For example, in a lithium-silver alloy, the amount of lithium which silver can form a solid solution therewith or dissolve at 25° C. without formation of additional phase may be about 45 at %. When the amount of lithium is greater than 45 at %, a separate alloy phase, such as LiAg may be formed.

Referring to FIGS. 1 to 4, an all-solid secondary battery 1 according to an embodiment comprises: a cathode layer 10, an anode layer 20; and a solid electrolyte 30 are disposed between the cathode layer 10 and the anode layer 20. In an aspect, the cathode layer 10 comprises a cathode active material layer 12 and a cathode current collector 11. The anode layer 20 comprises an anode current collector 21; a first anode active material layer 22 disposed on the anode current collector 21 and contacting the solid electrolyte layer 30; and a second anode active material layer 23 disposed between the anode current collector 21 and the first anode active material layer 22. The first anode active material layer 22 comprises a first metal, and the second anode active material layer 23 comprises a second metal. The lithium-ion reduction potential of the first metal is greater than the reduction potential of the solid electrolyte. The solid solubility of Li in the second metal is greater than the solid solubility of Li in the first metal.

Anode Layer

Referring to FIG. 1, the first anode active material layer 22 comprises a first metal, and a difference between the lithium-ion reduction potential of the first anode active material layer 22 and the reduction potential of the solid electrolyte 30 may be, for example, about 0.01 V or greater, about 0.02 V or greater, about 0.05 V or greater, about 0.1 V or greater, about 0.2 V or greater, or about 0.3 V or greater. For example the difference between the lithium-ion reduction potential of the first anode active material layer and the reduction potential of the solid electrolyte may be about 0.01 V to about 2.0 V, or about 0.2 V to about 1.5 V, or about 0.3 V to about 1.0 V. While not wanting to be bound by theory, it is understood that because the difference between the lithium-ion reduction potential of the first anode active material layer 22 and the reduction potential of the solid electrolyte is within these ranges, during charge and discharge, a reductive decomposition reaction of the solid electrolyte may be effectively suppressed.

A lithium-ion reduction potential of the first anode active material layer 22 may be, for example, with respect to lithium metal, e.g., $Li/Li^+$, about 0.05 V or greater, about 0.1 V or greater, about 0.2 V or greater, about 0.3 V or greater, about 0.4 V or greater, or about 0.5 V or greater (less than 5V). For example, the lithium-ion reduction potential of the first anode active material layer may be greater than about 0.05 V to less than about 5 V, or about 0.1 V to about 4.8 V, or about 0.5 V to about 4.5 V. For example, the lithium-ion reduction potential of the first anode active material layer may be about 0.05 V to about 4.0 V, about 0.05 V to about 3.5 V, about 0.05 V to about 3.0 V, about 0.05 V to about 2.5 V, about 0.05 V to about 2.0 V, about 0.05 V to about 1.5 V, or about 0.05 V to about 1.0 V. While not wanting to be bound by theory, it is understood that because the first anode active material layer 22 has such a high lithium-ion reduction potential, a decomposition reaction of the solid electrolyte may be suppressed.

In an aspect, a difference between the lithium-ion reduction potential of the first metal and the reduction potential of the solid electrolyte 30 may be about 0.01 V to about 2.0 V, or about 0.2 V to about 1.5 V, or about 0.3 V to about 1.0 V.

A lithium-ion reduction potential of the first metal may be, for example, with respect to lithium metal, e.g., $Li/Li^+$, about 0.05 V or greater, about 0.1 V or greater, about 0.2 V or greater, about 0.3 V or greater, about 0.4 V or greater, or about 0.5 V or greater (less than 5 V). For example, the lithium-ion reduction potential of the first metal may be about 0.05 V to less than about 5 V, or about 0.1 V to about 4.8 V, or about 0.5 V to about 4.5 V. For example, the lithium-ion reduction potential of the first metal may be about 0.05 V to about 4.0 V, about 0.05 V to about 3.5 V, about 0.05 V to about 3.0 V, about 0.05 V to about 2.5 V, about 0.05 V to about 2.0 V, about 0.05 V to about 1.5 V, or about 0.05 V to about 1.0 V. While not wanting to be bound by theory, it is understood that because the first metal included in the first anode active material layer 22 has such a high lithium-ion reduction potential, a decomposition reaction of the solid electrolyte may be suppressed. A reduction potential or reductive decomposition potential of the solid electrolyte included in the solid electrolyte layer 30 may be, for example, with respect to lithium metal, about 0.2 V or less, about 0.1 V or less, about 0.09 V or less, about 0.07 V or less, about 0.05 V or less, about 0.03 V or less, about 0.02 V or less, or about 0.01 V or less. For example, the reduction potential of the solid electrolyte may be about 0.001 V to about 0.2 V, or about 0.005 V to about 0.09 V, or about 0.005 V to about 0.01 V, vs. $Li/Li^+$. While not wanting to be bound by theory, it is understood that because the solid electrolyte has a such a low reduction potential, the solid electrolyte may provide a wider range of electrochemical stability, e.g., voltage window.

A lithium-ion reduction potential of the first anode active material layer 22 may be greater than a lithium-ion reduction potential of the second anode active material layer 23. For example, a difference between the lithium-ion reduction potential of the first anode active material layer 22 and the lithium-ion reduction potential of the second anode active material layer 23 may be, for example, about 0.01 V or greater, about 0.02 V or greater, about 0.05 V or greater, about 0.1 V or greater, about 0.2 V or greater, or about 0.3 V or greater (less than 5V). For example, a difference between the lithium-ion reduction potential of the first anode active material layer and the lithium-ion reduction potential of the second anode active material layer may be about 0.01 V to about 4.9 V, or about 0.2 V to about 4.5 V, or about 0.3 V to about 4.0 V. Also, a lithium-ion reduction potential of the first metal may be greater than a lithium-ion reduction potential of the second metal. While not wanting to be bound by theory, it is understood that because the first anode active material layer 22, and/or the first metal, has a greater lithium-ion reduction potential than the lithium-ion reduction potential of the second anode active material layer 23, and/or the second metal, a reductive decomposition reaction of the solid electrolyte due to the second anode active material layer 23 may be effectively suppressed, even when the lithium-ion reduction potential of the second anode active material layer 23 is less than the reduction potential of the solid electrolyte. In addition, selection of the second metal may be facilitated as long as the second metal has a lithium-ion reduction potential which is less than the lithium-ion reduction potential of the first metal of the first anode active material layer 22. For example, indium (In) as the first metal may have a lithium-ion reduction potential of about 0.6 V. For example, silver (Ag) as the second metal may have a lithium-ion reduction potential of about 0.2 V.

In an embodiment, the first anode active material layer 22, and/or the first metal, may have a lithium-ion reduction potential which is less than the lithium-ion reduction potential of the second anode active material layer 23, and/or the second metal. In an embodiment in which the first anode active material layer 22, e.g., the first metal, has a lithium-ion reduction potential greater than the reduction potential of the solid electrolyte, the lithium-ion reduction potential of the first anode active material layer 22, e.g., the first metal may be less than the lithium-ion reduction potential of the second anode active material layer 23, e.g., the second metal.

The first anode active material layer 22, e.g., the first metal, may have a lithium ion diffusivity (or lithium ion diffusion coefficient) equal to or greater than a lithium ion diffusivity of the second anode active material layer 23, e.g., the second metal. While not wanting to be bound by theory, it is understood that because the first anode active material layer 22, e.g., the first metal, has a greater lithium ion diffusivity, lithium introduced into the first anode active material layer 22 may rapidly move into the second anode active material layer 23, so that it may be possible to prevent local lithium deposition in the first anode active material layer 22 or in the interface between the first anode active material layer 22 and the solid electrolyte layer 30. The first anode active material layer 22 may have a lithium ion diffusivity at 25° C. of, for example, about $1 \times 10^{-14}$ square centimeters per second (cm$^2$/sec) or greater, about $1 \times 10^{-13}$ cm$^2$/sec or greater, about $1 \times 10^{-12}$ cm$^2$/sec or greater, about $1 \times 10^{-11}$ cm$^2$/sec or greater, about $1 \times 10^{-10}$ cm$^2$/sec or greater, or about $5 \times 10^{-10}$ cm$^2$/sec or greater. For example, the first anode active material layer, or the first metal, may have a lithium ion diffusivity at 25° C. of for example about $1 \times 10^{-16}$ cm$^2$/sec to about $1 \times 10^{-3}$ cm$^2$/sec, or about $1 \times 10^{-15}$ cm$^2$/sec to about $1 \times 10^{-4}$ cm$^2$/sec, or about $1 \times 10^{-14}$ cm$^2$/sec to about $1 \times 10^{-5}$ cm$^2$/sec, or about $1 \times 10^{-13}$ cm$^2$/sec to about $1 \times 10^{-6}$ cm$^2$/sec, or about $1 \times 10^{-12}$ cm$^2$/sec to about $1 \times 10^{-7}$ cm$^2$/sec. The second anode active material layer 23 may have a lithium ion diffusivity at 25° C. of, for example, about $1 \times 10^{-15}$ cm$^2$/sec or greater, about $1 \times 10^{-14}$ cm$^2$/sec or greater, about $1 \times 10^{-13}$ cm$^2$/sec or greater, about $1 \times 10^{-12}$ cm$^2$/sec or greater, about $1 \times 10^{-11}$ cm$^2$/sec or greater, or about $5 \times 10^{-11}$ cm$^2$/sec or greater (less than $5 \times 10^{-3}$ cm$^2$/sec). For example, the second anode active material layer, or the second metal, may have a lithium ion diffusivity at 25° C. of about $1 \times 10^{-16}$ cm$^2$/sec to about $1 \times 10^{-3}$ cm$^2$/sec, or about $1 \times 10^{-15}$ cm$^2$/sec to about $1 \times 10^{-3}$ cm$^2$/sec, or about $1 \times 10^{-12}$ cm$^2$/sec to about $1 \times 10^{-3}$ cm$^2$/sec, or about $1 \times 10^{-12}$ cm$^2$/sec to about $5 \times 10^{-4}$ cm$^2$/sec.

A difference between the solid solubility of Li in the second metal included in the second anode active material layer 23 and the solid solubility of Li in the first metal included in the first anode active material layer 22 may be, for example, about 10 at % or greater, about 15 at % or greater, about 20 at % or greater, about 25 at % or greater, about 30 at % or greater, about 35 at % or greater, about 40 at % or greater, about 45 at % or greater, or 50 at % or greater. For example, the difference between the solid solubility of Li in the second metal and the solid solubility of Li in the first metal may be about 10 at % to about 60 at %, or about 20 at % to about 55 at %, or about 30 at % to about 50 at %. While not wanting to be bound by theory, it is understood that when the difference between the solid solubility of Li in the second metal and the solid solubility of Li in the first metal is within these ranges, the lithium introduced into the first anode active material layer 22 including the first metal may be easily dissolved into the second anode active material layer 23 including the second metal. Consequentially, local deposition of lithium in the interface between the first anode active material layer 22 and the solid electrolyte layer may be suppressed. The solid solubility of Li in the second metal may be, for example, about 10 at % or greater, about 15 at % or greater, about 20 at % or greater, about 25 at % or greater, about 30 at % or greater, about 35 at % or greater, or about 40 at % or greater. For example, the solid solubility of Li in the second metal may be about 10 at % to about 70 at %, or about 20 at % to about 60 at %, or about 40 at % to about 60 at %. While not wanting to be bound by theory, it is understood that because the solid solubility of Li in the second metal is within these ranges, the second metal may more easily dissolve the lithium. The solid solubility of Li in the first metal may be, for example, about 40 at % or less, about 30 at % or less, about 20 at % or less, about 10 at % or less, about 5 at % or less, about 3 at % or less, about 2 at % or less, or about 1 at % or less. For example, the solid solubility of Li in the first metal may be about 0.1 at % to about 30 at %, or about 0.5 at % to about 20 at %, or about 0.5 at % to about 5 at %. While not wanting to be bound by theory, it is understood that when the solid solubility of Li in the first metal is within these ranges, local deposition of lithium between the first anode active material layer 22 including the first metal, and the solid electrolyte layer, may be prevented or suppressed.

The second metal included in the second anode active material layer 23 may have a Mohs hardness equal to or greater than the Mohs hardness of the first metal, and the first metal included in the first anode active material layer 22 may have a Mohs hardness equal to or greater than lithium. For example, lithium has a Mohs hardness of about 0.6, indium has a Mohs hardness of about 1.2, and silver has a Mohs hardness of about 2.5. A difference in a Mohs hardness between the first metal and the second metal may be, for example, about 0.1 or greater, about 0.2 or greater, about 0.3 or greater, about 0.4 or greater, about 0.5 or greater, about 1.0 or greater, or about 1.1 or greater. For example, differ-ence in Mohs hardness between the first metal and the second metal may be about 0.1 to about 2.0, or about 0.2 to about 1.5, or about 0.5 to about 1.1. A difference in Mohs hardness between the first metal and lithium may be, for example, about 0.1 or greater, about 0.2 or greater, about 0.3 or greater, about 0.4 or greater, about 0.5 or greater, about 1.0 or greater, or about 1.1 or greater. For example, a difference in Mohs hardness between the first metal and lithium may be about 0.1 to about 2, or about 0.2 to about 1.5, or about 0.5 to about 1.1.

In an aspect, the second metal included in the second anode active material layer 23 may have a yield strength equal to or greater than the yield strength of the first metal, and the first metal included in the first anode active material layer 22 may have a yield strength equal to or greater than the yield strength of the lithium metal. While not wanting to be bound by theory, it is understood that because the first metal has a hardness greater than lithium, lithium may be easily dissolved, e.g., solid-solubilized, or may more easily form a solid solution in the first metal. While not wanting to be bound by theory, it is understood that because the second metal has a hardness greater than the first metal, when pressing a laminate in which the solid electrolyte layer, the first metal layer and the second metal layer are sequentially stacked upon one another, the first metal layer may more flexibly contact an irregular surface of the solid electrolyte layer, and an interface resistance between the solid electro-lyte layer 30 and the first anode active material layer 22 may be more effectively reduced.

The first metal included in the first anode active material layer 22 may be, for example, at least one of indium (In), silicon (Si), gallium (Ga), tin (Sn), aluminum (Al), titanium (Ti), zirconium (Zr), niobium (Nb), germanium (Ge), anti-mony (Sb), bismuth (Bi), zinc (Zn), gold (Au), platinum (Pt), palladium (Pd), nickel (Ni), iron (Fe), cobalt (Co), chromium (Cr), cesium (Cs), cerium (Ce), or lanthanum (La). The first metal may be, for example, indium (In). When the first anode active material layer 22 includes these first metals, a short-circuit of the all-solid secondary battery may be prevented, and cycle characteristics may be improved.

The second metal included in the second anode active material layer 230 may be, for example, at least one of silver (Ag), gold (Au), platinum (Pt), palladium (Pd), silicon (Si), aluminum (Al), bismuth (Bi), magnesium (Mg), tin (Sn), or zinc (Zn). When the second anode active material layer 23 includes these second metals, a short-circuit of the all-solid secondary battery may be prevented, and cycle characteristics may be improved. Due to the arrangement of the second anode active material layer 23 between the first anode active material layer 22 and the anode current collector 21, for example, a third anode active material layer 24 deposited between the second anode active material layer 23 and the anode current collector 21 may become planar, and thus the all-solid secondary battery 1 may have further improved cycle characteristics. For example, the first metal and the second metal may be different from each other.

Figure 2:
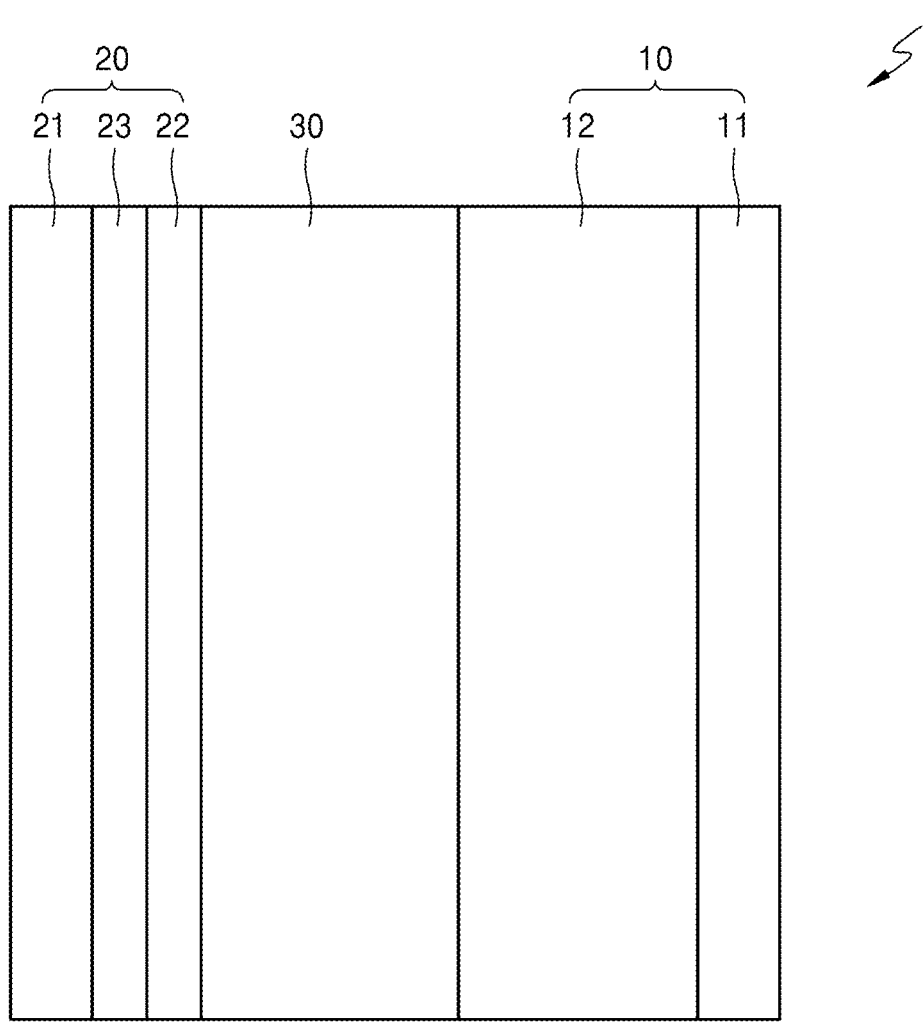
FIG. 2 is a cross-sectional view of an all-solid secondary battery according to an embodiment.

In an embodiment, referring to FIGS. 1 and 2, at least one of the first anode active material layer 22 and the second anode active material layer 23 may include, an anode active material in a form of a thin film.

The first anode active material layer 22 may include, for example, an anode active material in a form of a thin film, and the anode active material in the thin film form may include a first metal. That is, the first metal may be used, for example, in the form of a thin film. The first anode active material layer 22 may be, for example, a metal layer including at least one of a first metal, lithium metal, or an alloy of the first metal and lithium, e.g., a first metal-lithium alloy. For example, the first anode active material layer 22 may be a metal layer and may comprise or consist of a thin film of the first metal, a metal layer including a first metal-lithium alloy, or a metal layer including the first metal, lithium metal, or a first metal-lithium alloy. In an aspect, the first anode active material layer 22 includes only the first metal at a time of assembly, and may additionally include lithium metal and a first metal-lithium alloy after charging and/or discharging. For example, the first anode active material layer 22 may not include a carbonaceous material and/or an organic material. For example, the first anode active material layer 22 may not include a carbonaceous material, for example, a carbonaceous anode active material such as carbon black, or a carbonaceous conducting gent such as carbon nanofibers. For example, the first anode active material layer 22 may not include an organic material such as a binder. For example, the first anode active material layer 22 may be a metal layer, and may comprise, or consist of a metal, a metalloid, and/or an alloy thereof. While not wanting to be bound by theory, it is understood because that the first anode active material layer 22 is a metal layer, a side reaction from a carbonaceous material and/or an organic material during charge or discharge processes may be prevented. In an embodiment, the first anode active material layer 22 may include, for example, a Li-rich alloy represented by the formula of $Li_aM_b$, wherein M is the first metal, $0<a\leq5$, $0<b\leq4$, and $a>b$. In an embodiment, the first anode active material layer 22 may not include, for example, a Li-rich alloy phase represented by the formula $Li_aM_b$ wherein M is the first metal, $0<a\leq5$, $0<b\leq4$, and $a>b$. While not wanting to be bound by theory, it is understood that because the first anode active material layer 22 does not include a Li-rich alloy, local deposition of lithium, derived from the Li-rich alloy, in the interface between the first anode active material layer 22 and the solid electrolyte layer may be effectively prevented. The Li-rich alloy may be, for example, $Li_2M$, $Li_3M_2$, $Li_4M_3$, or $Li_5M_4$, wherein M is the first metal.

The second anode active material layer 23 may include, for example, an anode active material in a form of a thin film, and the anode active material in the thin film form may include a second metal. That is, the second metal may be used, for example, in a thin film form. The second anode active material layer 23 may be, for example, a metal layer including at least one of a second metal, lithium metal, or an alloy of the second metal and lithium, e.g., a second metal-lithium alloy. For example, the second anode active material layer 23 may be a metal layer comprising, e.g., consisting of, a thin film of the second metal, a metal layer including a second metal-lithium alloy, or a metal layer comprising at least one of the second metal, lithium, or a second metal-lithium alloy. In an aspect, the second anode active material layer 23 includes only the second metal at a time of assembly, and may additionally include lithium metal and a second metal-lithium alloy as charging and discharging proceed. For example, the second anode active material layer 23 may not include a carbonaceous material and an organic material. For example, the second anode active material layer 23 may not include a carbonaceous material, for example a carbonaceous anode active material such as carbon black, or a carbonaceous conducting agent such as carbon nanofibers. The second anode active material layer 23 may not include an organic material such as a binder. The second anode active material layer 23 may be a metal layer, and may comprise or consist of a metal, a metalloid, and/or an alloy thereof. While not wanting to be bound by theory, it is understood that because the second anode active material layer 23 is a metal layer, a side reaction with a carbonaceous material and/or organic material during a charge or a discharge processes may be prevented.

The thickness of the first anode active material layer 22 and the second anode active material layer 23 may each independently, for example, be about 50% or less, 40% or less, 30% or less, 20% or less, or 10% or less of the thickness of the cathode active material layer 12. For example, the thickness of the first anode active material layer 22 and the second anode active material layer 23 may each independently be about 2.5% to about 50%, or about 5% to about 40%, or about 5% to about 20% of the thickness of the cathode active material layer. As the thickness of the first anode active material layer 22 and/or the second anode active material layer 23 is less than the thickness of the cathode active material layer 12, the all-solid secondary battery may have improved energy density.

The thickness of the first anode active material layer and/or the second anode active material layer, which include an anode active material in thin film form may each independently be, for example, about 1 nanometer (nm) to about 100 micrometer ($\mu$m), about 10 nm to about 100 $\mu$m, about 100 nm to about 10 $\mu$m, about 1 $\mu$m to about 100 $\mu$m, about 5 $\mu$m to about 90 $\mu$m, about 10 $\mu$m to about 80 $\mu$m, about 15 $\mu$m to about 80 $\mu$m, about 20 $\mu$m to about 70 $\mu$m, about 20 $\mu$m to about 60 $\mu$m, about 20 $\mu$m to about 55 $\mu$m, or about 20 $\mu$m to about 50 $\mu$m. When the thickness of the first anode active material layer 22 and/or the second anode active material layer 23 is within these ranges, a short-circuit of the all-solid secondary battery may be suppressed and cycle characteristics may be improved. The first anode active material layer 22 and/or the second anode active material layer 23 may be disposed by, for example, vacuum deposition, sputtering, or plating. However, embodiments are not limited to these methods, and any suitable method for forming anode active material layers may be used.

In particular, the thickness of the first anode active material layer and/or the second anode active material layer, which include an anode active material in thin film form, may be, for example, about 1 nm to about 500 nm, about 10 nm to about 500 nm, about 10 nm to about 400 nm or less, about 10 nm to about 300 nm, about 10 nm to about 200 nm, about 10 nm to about 150 nm, or about 10 nm to about 100 nm. When the thickness of the first anode active material layer and the second anode active material layer is within these ranges, a short-circuit of the all-solid secondary battery may be suppressed, and cycle characteristics may be improved. When the thickness of the first anode active material layer and/or the second anode active material layer is less than 1 nm, the respective first anode active material layer and/or second anode active material layer may not function as an anode active material layer. When the first anode active material layer and/or the second anode active material layer is too thick, the all-solid secondary battery may have reduced energy density, and may have increased internal resistance due to the thickness of the first anode active material layer and/or the second anode active material layer, and thus have degraded cycle characteristics. The first anode active material layer and/or the second anode active material layer may be disposed by, for example, vacuum deposition, sputtering, or plating. However, embodiments are not limited to these methods, and any suitable method for forming the anode active material layer may be used.

For example, the first anode active material layer including an anode active material in thin film form may have a thickness of about 1 μm to about 100 μm, and the second anode active material layer including an anode active material in thin film form may have a thickness of about 1 μm to about 100 μm. For example, the first anode active material layer including an anode active material in thin film form may have a thickness of about 1 nm to about 500 μm, and the second anode active material layer including an anode active material in thin film form may have a thickness of about 1 nm to about 500 nm. For example, the first anode active material layer including an anode active material in thin film form may have a thickness of about 1 μm to about 100 μm, and the second anode active material layer including an anode active material in thin film form may have a thickness of about 1 nm to 500 nm. For example, the first anode active material layer including an anode active material in thin film form may have a thickness of about 1 nm to about 500 nm, and the second anode active material including an anode active material in thin film form may have a thickness of about 1 um to about 100 μm.

In an embodiment, referring to FIGS. 1 and 2, at least one of the first anode active material layer 22 and the second anode active material layer 23 may include, for example, an anode active material in the form of particles and a binder.

The anode active material in the form of particles included the at least one of the first anode active material layer 22 and the second anode active material layer 23 may have an average particle diameter of about 4 μm or less, about 3 μm or less, about 2 μm or less, about 1 μm or less, or about 900 nm or less. For example, the anode active material in the form of particles may have an average particle diameter of about 10 nm to about 4 μm, about 10 nm to about 3 μm, about 10 nm to about 2 μm, about 10 nm to about 1 μm, or about 10 nm to about 900 nm. When the anode active material has an average particle diameter within these ranges, reversible absorption and/or desorption of lithium during charging and discharging may be further facilitated. The average particle diameter of the anode active material may be a median diameter (D50) obtained by, for example, a laser-diffraction particle size distribution analyzer.

The anode active material in the form of particles included in at least one of the first anode active material layer 22 and the second anode active material layer 23 may further include at least one of a carbonaceous anode active material, a metal, or a metalloid. "Metalloid" refers to at least one of B, Si, Ge, As, Sb, Te, or a combination thereof. The carbonaceous anode active material in the form of particles may be, for example, amorphous carbon. For example, the amorphous carbon may be carbon black (CB), acetylene black (AB), furnace black (FB), Ketjen black (KB), graphene, or a combination thereof. However, embodiments are not limited thereto. Any suitable amorphous carbon may be used. The amorphous carbon refers to carbon without crystallinity or with very low crystallinity, and is distinguished from crystalline carbon or graphitic carbon. The metal or metalloid anode active material in the form of particles included in the first anode active material layer 22 may include, for example, at least one of indium (In), silicon (Si), gallium (Ga), tin (Sn), aluminum (Al), titanium (Ti), zirconium (Zr), niobium (Nb), germanium (Ge), antimony (Sb), bismuth (Bi), zinc (Zn), gold (Au), platinum (Pt), palladium (Pd), iron (Fe), cobalt (Co), chromium (Cr), magnesium (Mg), cesium (Cs), cerium (Ce), or lanthanum (La). The metal or metalloid anode active material in the form of particles included in the second anode active material layer 23 may include at least one of gold (Au), platinum (Pt), palladium (Pd), silicon (Si), silver (Ag), aluminum (Al), bismuth (Bi), tin (Sn), or zinc (Zn). For example, nickel (Ni), which does not form an alloy with lithium, is not an available metal or metalloid anode active material.

The at least one of the first anode active material layer 22 and the second anode active material layer may include one of the above-listed anode active materials in the form of particles, or a combination including at least two of the above-listed anode active materials. For example, the first anode active material layer may include only first particles consisting of or consisting essentially of amorphous carbon, or second particles consisting of, or consisting essentially of, at least one of indium (In), silicon (Si), gallium (Ga), tin (Sn), aluminum (Al), titanium (Ti), zirconium (Zr), niobium (Nb), germanium (Ge), antimony (Sb), bismuth (Bi), zinc (Zn), gold (Au), platinum (Pt), palladium (Pd), nickel (Ni), iron (Fe), cobalt (Co), chromium (Cr), magnesium (Mg), cesium (Cs), cerium (Ce), or lanthanum (La). In other embodiments, the first anode active material layer 22 may include a combination of first particles consisting of, or consisting essentially of amorphous carbon, and second particles consisting of, or consisting essentially of at least one of indium (In), silicon (Si), gallium (Ga), tin (Sn), aluminum (Al), titanium (Ti), zirconium (Zr), niobium (Nb), germanium (Ge), antimony (Sb), bismuth (Bi), zinc (Zn), gold (Au), platinum (Pt), palladium (Pd), nickel (Ni), iron (Fe), cobalt (Co), chromium (Cr), magnesium (Mg), cesium (Cs), cerium (Ce), or lanthanum (La). The amount of the second particles may be about 8 weight percent (wt %) to about 60 wt %, about 10 wt % to about 50 wt %, about 15 wt % to about 40 wt %, or about 20 wt % to about 30 wt %, with respect to a total weight of the first particles and the second particles. By inclusion of the amount of the second particles within these ranges, for example, the all-solid secondary battery 1 may have further improved cycle characteristics.

For example, the second anode active material layer 23 may include only first particles consisting of amorphous carbon, or second particles consisting of at least one of gold (Au), platinum (Pt), palladium (Pd), silicon (Si), silver (Ag), aluminum (Al), bismuth (Bi), tin (Sn), or zinc (Zn). In other embodiments, the second anode active material layer 23 may include a combination of first particles consisting of amorphous carbon, and second particles consisting of at least one of gold (Au), platinum (Pt), palladium (Pd), silicon (Si), silver (Ag), aluminum (Al), bismuth (Bi), tin (Sn), or zinc (Zn). The amount of the second particles may be about 8 wt % to about 60 wt %, about 10 wt % to about 50 wt %, about 15 wt % to about 40 wt %, or about 20 wt % to about 30 wt %, with respect to a total weight of the first particles and the second particles. By the inclusion of the amount of the second particles within these ranges, for example, the all-solid secondary battery 1 may have further improved cycle characteristics.

The at least one of the first anode active material layer 22 and the second anode active material layer 23 may include, for example, a binder. The binder may include, for example, at least one of a styrene-butadiene rubber (SBR), polytetrafluoroethylene, polyvinylidene fluoride, polyethylene, a vinylidene fluoride/hexafluoropropylene copolymer, polyacrylonitrile, or polymethylmethacrylate. However, embodiments are not limited thereto. Any suitable binder may be used. The binder may include a single binder or a plurality of different binders. By the inclusion of the binder in the first anode active material layer 22, for example, the first anode active material layer 22 may be stabilized on the solid electrolyte layer 30. In addition, cracking of the first anode active material layer 22 may be suppressed despite volume change and/or relative position change of the first anode active material layer 22 during charging and discharging processes. For example, when the first anode active material layer 22 does not include a binder, the first anode active material layer 22 may be easily separated from the solid electrolyte layer 30. Since migration of lithium ions is not possible in such a portion of the first anode active material layer 22 separated from the solid electrolyte layer 30, the all-solid secondary battery 30 may have increased internal resistance. For example, the first anode active material layer 22 may be formed by coating, on the solid electrolyte layer 30, a slurry in which ingredients of the first anode active material layer 22 are dispersed, and then drying the resulting product. The inclusion of the binder in the first anode active material layer 22 enables the anode active material in the form of particles to be stably dispersed in the slurry. For example, when the slurry is coated on the anode current collector 21 by screen printing, clogging of the screen (for example, clogging by aggregates of the anode active material in the form of particles) may be suppressed. By the inclusion of the binder in the second anode active material layer 23, for example, the second anode active material layer 23 may be stabilized on the first anode active material layer 22 or the anode current collector 21. In addition, cracking of the second anode active material layer 23 may be suppressed despite volume change and/relative position change of the second anode active material layer 23 during charging and discharging of the all-solid secondary battery. For example, when the second anode active material layer 2 does not include a binder, the second anode active material layer 23 may be easily separated from the first anode active material layer 22 and/or the anode current collector 21. Since migration of electrons is not possible in such a portion of the second anode active material layer 23 separated from the anode current collector 21, the all-solid secondary battery 1 may have increased internal resistance. For example, the second anode active material layer 23 may be formed by coating, on the first anode active material layer 22 or the anode current collector 21, a slurry in which constituent ingredients of the second anode active material layer 23 are dispersed, and then drying the resulting product. The inclusion of the binder in the second anode active material layer 23 enables the anode active material in the form of particles to be stably dispersed in the slurry. For example, when the slurry is coated on the first anode active material layer 22 or the anode current collector 21 by screen printing, clogging of the screen (for example, clogging by aggregates of the anode active material in the form of particles) may be suppressed.

For example, the anode current collector 21 may consist of a material which does not react with lithium or a material which does not form an alloy or compound with lithium. The material of the anode current collector 21 may be, for example, copper (Cu), stainless steel (SUS), titanium (Ti), iron (Fe), cobalt (Co), nickel (Ni), or combination thereof. However, embodiments are not limited thereto. Any material suitable as an anode current collector may be used. The anode current collector 21 may include one of the above-listed metals, an alloy thereof, or a coated material of two or more of the above-listed metals. The anode current collector 12 may be, for example, in the form of a plate or a foil.

At least one of the first anode active material layer 22 and the second anode active material layer 23 of the all-solid secondary battery 1 may further include an additive(s) commonly used in the related art, for example, a filler, a dispersing agent, or an ionic conducting agent.

The thickness of the first anode active material layer 22 and/or the second anode active material layer 23 including an anode active material in the form of particles may be, for example, about 50% or less, about 40% or less, about 30% or less, about 20% or less, or about 10% or less of the thickness of the cathode active material layer 12. For example, the thickness of the first anode active material layer and the second anode active material layer including the anode active material as particles may each independently be about 2.5% to about 50%, or about 5% to about 40%, or about 5% to about 20% of the thickness of the cathode active material layer. When the thickness of the first anode active material layer 22 and/or the second anode active material layer 23 is smaller than the thickness of the cathode active material layer 12, the all-solid secondary battery 1 may have improved energy density.

The thickness of the first anode active material layer 22 and/or the second anode active material layer 23 including an anode active material in the form of particles may be, for example, about 1 μm to about 20 μm, about 2 μm to about 10 μm, or about 3 μm to about 7 μm. When the thickness of the first anode active material layer 22 and/or the second anode active material layer 23 including an anode active material in the form of particles are within these ranges, a short-circuit of the all-solid secondary battery may be suppressed, and cycle characteristics may be improved. When the first anode active material layer and/or the second anode active material layer including an anode active material in the form of particles becomes too thick, the all-solid secondary battery may have reduced energy density, and may have increased internal resistance due to the thickness of the first anode active material layer and/or the second anode active material layer, and thus it may be difficult to improve cycle characteristics of the all-solid secondary battery.

For example, the first anode active material layer 22 including an anode active material in the form of particles may have a thickness of about 1 μm to about 20 μm, or about 2 μm to about 15 μm, or about 5 μm to about 10 μm, and the second anode active material layer 23 including an anode active material in the form of particles may have a thickness of about 1 μm to about 20 μm, or about 2 μm to about 15 μm, or about 5 μm to about 10 μm. For example, the first anode active material layer 22 including an anode active material in thin film form may have a thickness of about 1 μm to about 100 μm, and the second anode active material layer 23 including an anode active material in the form of particles may have a thickness of about 1 µm to about 20 µm. For example, the first anode active material layer 22 including an anode active material in thin film form may have a thickness of about 1 nm to 500 nm, and the second anode active material layer 23 including an anode active material in the form of particles may have a thickness of about 1 µm to about 20 µm. For example, the firsts anode active material layer 22 including an anode active material in the form of particles may have a thickness of about 1 µm to about 20 µm, and the second anode active material layer including an anode active material in thin film form may have a thickness of about 1 µm to about 100 µm. For example, the first anode active material layer 22 including an anode active material in the form of particles may have a thickness of about 1 µm to about 20 µm, and the second anode active material including an anode active material in thin film form may have a thickness of about 1 nm to 500 nm.

Figure 3:
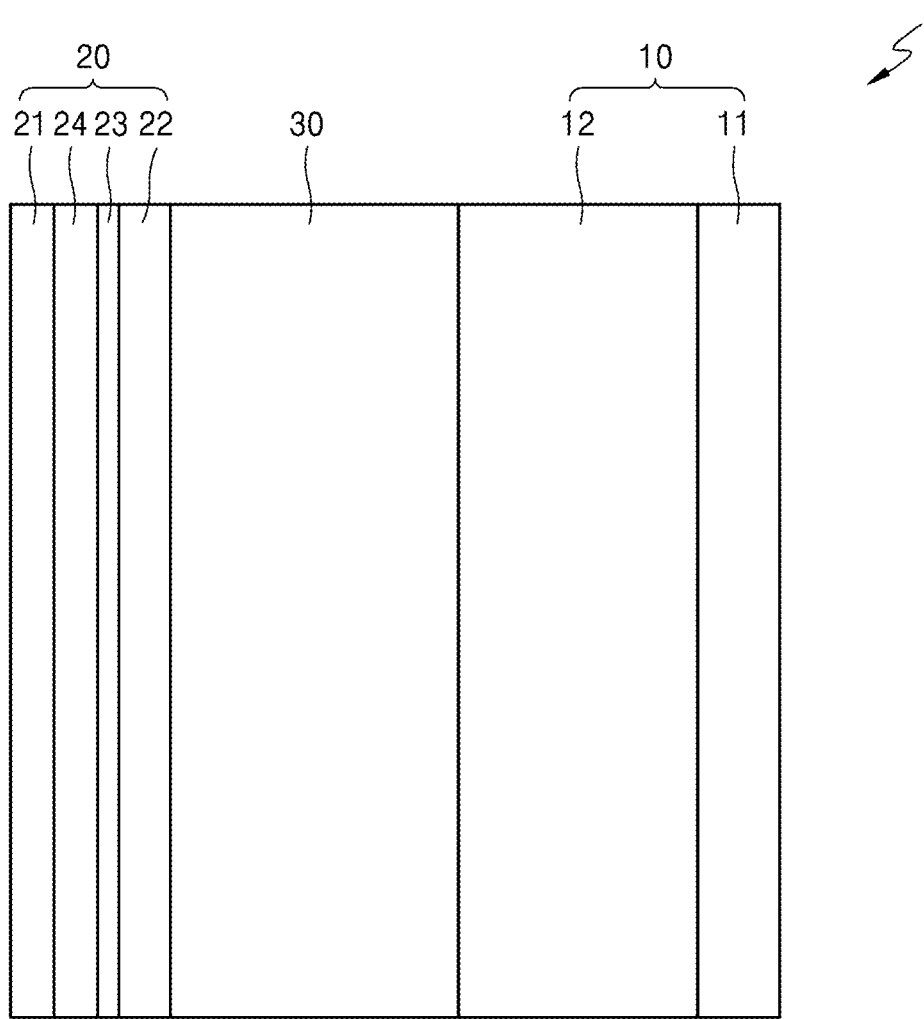
FIG. 3 is a cross-sectional view of an all-solid secondary battery according to an embodiment.
Figure 4:
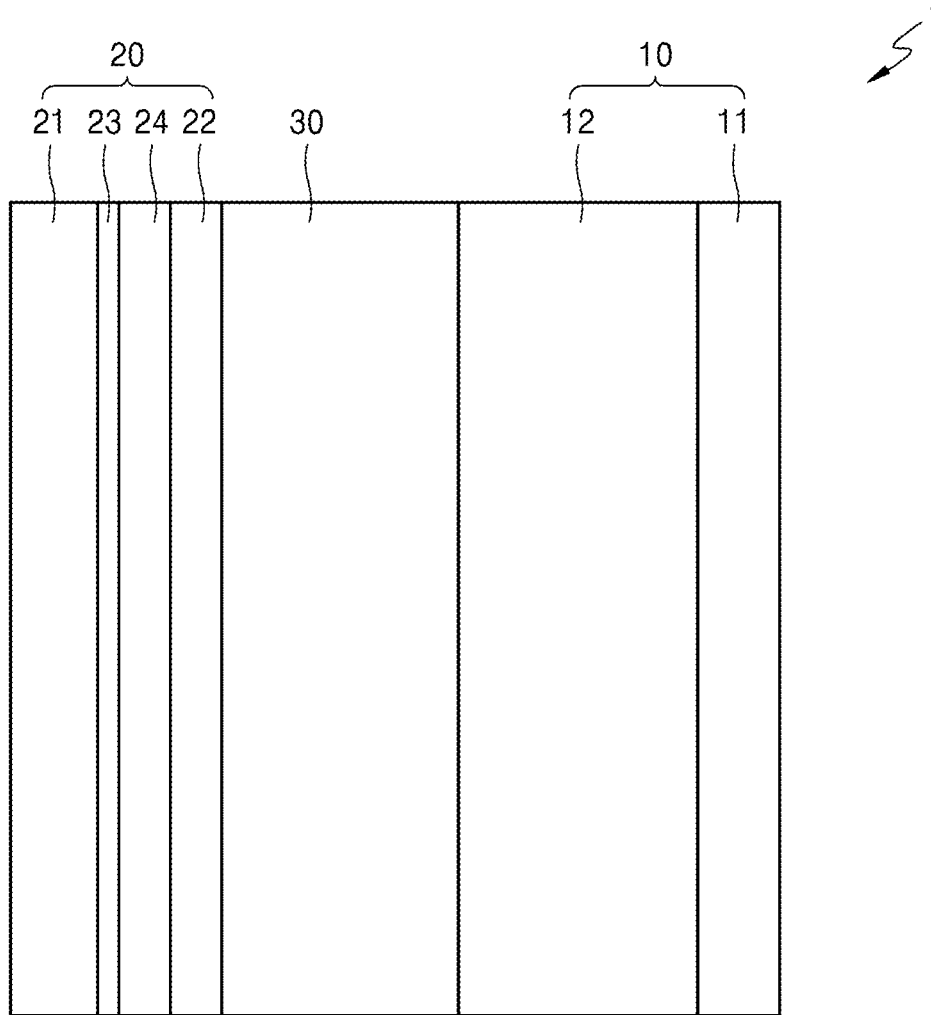
FIG. 4 is a cross-sectional view of an all-solid secondary battery according to an embodiment.

Referring to FIGS. 3 and 4, an all-solid secondary battery 1 according to an embodiment may further include a third anode active material layer 24, which may be disposed by charging, for example, between the anode current collector 21 and the second anode active material layer 23 and/or between the first anode active material layer 22 and the second anode active material layer 23 and/or between the solid electrolyte layer 30 and the first anode active material layer 22. The third anode active material layer 24 may be a metal layer including lithium or a lithium alloy. Accordingly, the third anode active material layer 24, as a metal layer including lithium, may function as a lithium reservoir. The lithium alloy may be, for example, at least one of a Li—Al alloy, a Li—Sn alloy, a Li—In alloy, a Li—Ag alloy, a Li—Au alloy, a Li—Zn alloy, a Li—Ge alloy, or a Li—Si alloy. However, embodiments are not limited to these alloys, and any suitable lithium alloy may be used. The third anode active material layer 24 may consist of lithium or a lithium alloy, or may consist of a plurality of lithium alloys.

The thickness of the third anode active material layer 24 is not specifically limited, and may be, for example, about 1 µm to about 1000 µm, about 1 µm to about 500 µm, about 1 um to about 200 µm, about 1 µm to about 150 µm, about 1 µm to about 100 µm, or about 1 µm to about 50 µm. When the thickness of the third anode active material layer 23 is too thin, the third anode active material layer 24 may not function as a lithium reservoir. When the thickness of the third anode active material layer 24 is too thick, the all-solid secondary battery 1 may be increased in mass and volume, and cycle characteristics may be degraded. The third anode active material layer 24 may be, for example, a metal foil having a thickness within the above-described ranges.

For example, the third anode active material layer 24 of the all-solid secondary battery 1 may be disposed, prior to assembly of the all-solid secondary battery 1, between the anode current collector 21 and the second anode active material layer 23, or between the first anode active material layer 22 and the second anode active material layer 23. In another embodiment, the third anode active material layer 24 of the all-solid secondary battery 1 may be formed by precipitation of Li during charging of the all-solid secondary battery 1 after assembly. The third anode active material layer 24 may be formed by precipitation between the anode current collector 21 and the second anode active material layer 23, or between the first anode active material layer 22 and the second anode active material layer 23.

In the case where the third anode active material layer 24 is disposed prior to the assembly of the all-solid secondary battery 1, the third anode active material layer 24, which is a metal layer including lithium, may serve as a lithium reservoir. The all-solid secondary battery 1 including the third anode active material layer 24 may have further improved cycle characteristics. For example, before assembly of the all-solid secondary battery 1, a lithium foil as the third anode active material layer 24 may be disposed between the anode current collector 21 and the second anode active material layer 23, or between the first anode active material layer 22 and the second anode active material layer 23.

In the case where the third anode active material layer 24 is disposed during charge of the all-solid secondary battery 1, the all-solid secondary battery 1 may have increased energy density since the third anode active material layer 24 is not included at the time of battery assembly. For example, the all-solid secondary battery 1 may be charged to exceed the charge capacity of the first anode active material layer 22 and the second anode active material layer 23. That is, the first anode active material layer 22 and the second anode active material layer 23 may be overcharged. At an initial charging stage, lithium may be absorbed into the first anode active material layer 22 and the second anode active material layer 23. That is, the anode active material in the first anode active material layer 22 and the second anode active material layer 23 may form an alloy or compound with lithium ions moved from the cathode layer 10. When the all-solid secondary battery 1 is charged over the capacity of the first anode active material layer 22 and the second anode active material layer 23, for example, lithium may be precipitated on a rear surface of the second anode active material layer 23, i.e., between the anode current collector 21 and the second anode active material layer 23, thus forming a metal layer corresponding to the third anode material layer 24. In another embodiment, when the all-solid secondary battery 1 is charged over the capacity of the first anode active material layer 22 and the second anode active material layer 23, for example, lithium may be precipitated on a front surface of the second anode active material layer 23, i.e., between the first anode active material layer 22 and the second anode active material layer 23, thus forming a metal layer corresponding to the third anode active material layer 24. The third anode active material layer 24 may be a metal layer including lithium (i.e., metal lithium) as a major component. This may be attributed to, for example, the fact that the anode active material in the first anode active material layer 22 and the second anode active material layer 23 includes a material capable of forming an alloy or compound with lithium. During discharging, lithium in the first anode active material layer 22, the second anode active material layer 23, and the third anode active material layer (24), i.e., lithium in the metal layers may be ionized and then move towards the cathode layer 10. Accordingly, the all-solid secondary battery 1 may use lithium as the anode active material. Since the first anode active material layer 22 and/or the second anode active material layer 23 coat the third anode active material layer 24, the first anode active material layer 22 and/or the second anode active material layer 23 may function as a protective layer of the third anode active material layer 24, i.e., metal layer, and at the same time suppress precipitation and growth of lithium dendrite. Accordingly, a short-circuit and reduction in capacity of the all-solid secondary battery 1 may be suppressed, and consequently cycle characteristics of the all-solid secondary battery 1 may be improved.

For example, the thickness of the first anode active material layer after being charged may be about 5% to 150%, about 10% to 120%, about 20% to 100%, about 30% to 80%, or about 33% to 66% of the thickness of the third anode active material layer 24. When the thickness of the first anode active material layer 22 is too thin, the first anode active material layer 22 may not properly function. When the thickness of the first anode active material layer 22 is too thick, the all-solid secondary battery 1 may have reduced energy density.

In the case where the third anode active material layer 24 is disposed through charging after assembly of the all-solid secondary battery 1, the anode current collector 21, the first anode active material layer 22, the second anode active material layer 23, and regions therebetween may be, for example, Li-free regions which do not include lithium (Li) in an initial state or a post-discharge state of the all-solid secondary battery.

In and embodiments, an all-solid secondary battery 1 comprises a cathode layer 10 comprising a cathode active material; an anode layer 20; and a solid electrolyte layer 30 comprising a solid electrolyte and disposed between the cathode layer 10 and the anode layer 20, wherein the anode layer 20 comprises an anode current collector 21, a first anode active material layer 22 in contact with the solid electrolyte layer 30, and a second anode active material layer 23 disposed between the anode current collector 21 and the first anode active material layer 22, a third anode active material layer 24 disposed between the anode current collector 21 and the solid electrolyte layer 30, wherein the third anode active material layer 24 comprises lithium or a lithium alloy, wherein the first anode active material layer 22 comprises a first metal and has a lithium-ion reduction potential greater than a reduction potential of the solid electrolyte, and wherein the second anode active material layer 23 comprises a second metal, and a solid solubility of lithium in the second metal is greater than a solid solubility of lithium in the first metal, wherein the third anode active material layer 24 is a plated layer. For example, the third anode active material layer 24 consists of lithium. The third anode active material layer 24 may be disposed between the anode current collector 21 and the second anode active material layer 23, and/or between the first anode active material layer 22 and the second anode active material layer 23, and/or between the solid electrolyte layer 30 and the first anode active material layer 22. The plated layer is disposed the anode current collector 21 and the solid electrolyte layer 30 by charging the all-slid secondary battery.

Protected Electrode

Also disclosed a protected electrode comprising: a current collector; a first layer; a second layer disposed between the current collector and the first layer; and a solid electrolyte, wherein the first layer comprises a first metal and has a lithium-ion reduction potential greater than a reduction potential of the solid electrolyte, and wherein the second layer comprises a second metal, and a solid solubility of lithium in the second metal is greater than a solid solubility of lithium in the first metal.

The first layer may correspond to the first anode active material layer, and the second layer may correspond to the second anode active material layer, each of which is further disclosed above. For clarity, the above disclosure is not repeated. In an aspect, lithium may be electrochemically provided in the protected electrode, for example by charging.

Solid Electrolyte Layer

Referring to FIGS. 1 to 4, the solid electrolyte layer 30 may contain a solid electrolyte between the cathode layer 10 and the anode layer 20.

The solid electrolyte may be, for example, an oxide-based solid electrolyte. The oxide-based solid electrolyte may be at least one of $Li_{1+x+y}Al_xTi_{2-x}Si_yP_{3-y}O_{12}$ (wherein $0<x<2$ and $0\leq y<3$), $BaTiO_3$, $Pb(Zr_xTi_{1-x})O_3$ wherein $0\leq x\leq 1$ (PZT), $Pb_{1-x}La_xZr_{1-y}Ti_yO_3$ (PLZT) (wherein $0\leq x<1$ and $0\leq y<1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ (wherein $0<x<2$ and $0<y<3$), $Li_xAl_yTi_z(PO_4)_3$ (wherein $0<x<2$, $0<y<1$, and $0<z<3$), $Li_{1+x+y}(Al_{a}Ga_{1-a})_x(Ti_bGe_{1-b})_{2-x}Si_yP_{3-y}O_{12}$ wherein $0\leq y\leq 1$, $0\leq y\leq 1$, $0\leq a\leq 1$, and $0\leq b\leq 1$, $Li_xLa_yTiO_3$ (wherein $0<x<2$ and $0<y<3$), $Li_2O$, $LiOH$, $Li_2CO_3$, $LiAlO_2$, $Li_2O$—$Al_2O_3$—$SiO_2$—$P_2O_5$—$TiO_2$—$GeO_2$, or $Li_{3+x}La_3M_2O_{12}$ (wherein M is at least one of Te, Nb, or Zr, and x is an integer from 1 to 10). The solid electrolyte may be prepared using, for example, sintering. For example, the oxide-based solid electrolyte may be a garnet-type solid electrolyte selected from $Li_7La_3Zr_2O_{12}$ (LLZO) and $Li_{3+x}La_3Zr_{2-a}M_aO_{12}$ (M-doped LLZO, wherein M is at least one of Ga, W, Nb, Ta, or Al, and x is an integer from 1 to 10 and $0\leq a<2$).

In another embodiment, the solid electrolyte may be, for example, a sulfide-based solid electrolyte. The sulfide-based solid electrolyte may be, for example, at least one of $Li_2S$—$P_2S_5$, $Li_2S$—$P_2S_5$—LiX (wherein X is a halogen), $Li_2S$—$P_2S_5$—$Li_2O$, $Li_2S$—$P_2S_5$—$Li_2O$—LiI, $Li_2S$—$Si_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (wherein m and n are each independently a positive number, and Z is at least one of Ge, Zn, or Ga), $Li_2S$—$GeS_2$, $Li_2S$—$SiS_2$—$Li_3PO_4$, $Li_2S$—$SiS_2$—$Li_pMO_q$ (wherein p and q are each independently a positive number, and M is at least one of P, Si, Ge, B, Al, Ga, or In) $Li_{7-x}PS_{6-x}Cl_x$ (wherein $0\leq x\leq 2$), $Li_{7-x}PS_{6-x}Br_x$ (wherein or $Li_{7-x}PS_{6-x}I_x$ (wherein $0\leq x\leq 2$). The sulfide-based solid electrolyte may be prepared using a starting source material, for example, $Li_2S$, $P_2S_5$, or the like by melt quenching or mechanical milling. After these treatments, thermal treatment may further be performed. The sulfide-based solid electrolyte may be amorphous, crystalline, or a mixed state thereof.

In addition, the sulfide-based solid electrolyte may be, for example, any of the above-listed sulfide-based solid electrolyte materials including at least sulfur (S), phosphorous (P), and lithium (Li) as constituent elements. For example, the sulfide-based solid electrolyte may be a material including $Li_2S$—$P_2S_5$. When a sulfide-based solid electrolyte including $Li_2S$—$P_2S_5$ is used, a mixed mole ratio of $Li_2S$ to $P_2S_5$ ($Li_2S$:$P_2S_5$) may be, for example, in a range of about 50:50 to about 90:10.

The sulfide-based solid electrolyte may be a compound having an argyrodite-type crystal structure. The compound having an argyrodite-type crystal structure may include, for example, at least one selected from $Li_{7-x}PS_{6-x}Cl_x$ (wherein $0\leq x\leq 2$), $Li_{7-x}PS_{6-x}Br_x$ (wherein $0\leq x\leq 2$), and $Li_{7-x}PS_{6-x}I_x$ (wherein $0\leq x\leq 2$). In particular, the sulfide-based solid electrolyte may be an argyrodite-type compound including at least one selected from $Li_6PS_5Cl$, $Li_6PS_5Br$, and $Li_6PS_5I$.

For example, the solid electrolyte layer 30 may further include a binder. The binder included in the solid electrolyte layer 30 may be, for example, a styrene-butadiene rubber (SBR), polytetrafluoroethylene (PTFE), polyvinylidene fluoride (PVDF), or polyethylene. However, embodiments are not limited thereto. Any binder available in the art may be used. The binder of the solid electrolyte layer 30 may be the same as or different from the binders of the cathode active material layer 12 and the first anode active material layer 22.

Cathode Layer

The cathode layer 10 may include a cathode current collector 11 and the cathode active material layer 12.

The cathode current collector 11 may be a plate or foil including indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. The cathode current collector 11 may be omitted.

The cathode active material layer 12 may include, for example, a cathode active material.

The cathode active material may be a cathode active material capable of absorption and desorption of lithium ions. The cathode active material may include, for example, at least one of a lithium transition metal oxide, such as lithium cobalt oxide (LCO), lithium nickel oxide, lithium nickel cobalt oxide, lithium nickel cobalt aluminum oxide (NCA), lithium nickel cobalt manganese oxide (NCM), lithium manganate, or lithium iron phosphate; nickel sulfide; copper sulfide; lithium sulfide; iron oxide; or vanadium oxide. However, embodiments are not limited thereto. Any suitable cathode active material may be used. These cathode active materials may be used alone or in a combination comprising at least two of the foregoing.

The lithium transition metal oxide may be, for example, a compound represented by at least one of the following formula: $Li_aA_{1-b}B'_bD_2$ (wherein $0.90 \leq a \leq 1$, and $0 \leq b \leq 0.5$); $Li_aE_{1-b}B'_bO_{2-c}D_c$ (wherein $0.90 \leq a \leq 1$, $0 \leq b \leq 0.5$, and $0 \leq c \leq 0.05$); $LiE_{2-b}B'_bO_{4-c}D_c$ (wherein $0 \leq b \leq 0.5$, and $0 \leq c \leq 0.05$); $Li_aNi_{1-b-c}Co_bB'_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aN_{1-b-c}Co_bB'_cO_{2-\alpha}F'_2$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_bE_cG_dO_2$ (wherein $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1$, and $0.001 \leq b \leq 0.1$); $Li_aCoG_bO_2$ (wherein $0.90 \leq a \leq 1$, and $0.001 \leq b \leq 0.1$); $Li_aMnG_bO_2$ (wherein $0.90 \leq a \leq 1$, and $0.001 \leq b \leq 0.1$); $Li_aMn_2G_bO_4$ (wherein $0.90 \leq a \leq 1$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); or $LiFePO_4$. In the formulae above, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or combination thereof; F' may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

The compounds listed above as cathode active materials may have a surface coating layer (hereinafter, also referred to as "coating layer"). Alternatively, a mixture of a compound without a coating layer and a compound having a coating layer, the compounds being selected from the compounds listed above, may be used. In some embodiments, the coating layer on the surface of such compounds may include a coating element compound which is at least one of an oxide, a hydroxide, an oxyhydroxide, an oxycarbonate, or an hydroxycarbonate of the coating element. In some embodiments, the compounds for the coating layer may be amorphous or crystalline. In some embodiments, the coating element for the coating layer may be at least one of magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), or zirconium (Zr). In some embodiments, the coating layer may be formed using any method that does not adversely affect the physical properties of the cathode active material. For example, the coating layer may be formed using a spray coating method, a dipping method, or the like. The coating methods may be well understood by one of ordinary skill in the art, and thus a detailed description thereof will be omitted.

The cathode active material may include, for example a lithium salt of a transition metal oxide having a layered rocksalt-type structure among the above-listed lithium transition metal oxides. The term "layered rocksalt-type structure" used herein refers to a structure in which oxygen atomic layers and metal atomic layers are alternately regularly disposed in the direction of <111> planes, with each atomic layer forming a 2-dimensional (2D) plane. A "cubic rocksalt-type structure" refers to a sodium chloride (NaCl)-type crystal structure, and in particular, a structure in which face-centered cubic (fcc) lattices formed by respective cations and anions are disposed in a way that ridges of the unit lattices are shifted by ½. The lithium transition metal oxide having such a layered rocksalt-type structure may be, for example, a ternary lithium transition metal oxide such as $LiNi_xCo_yAl_zO_2$ (NCA) (wherein $0 < x < 1$, $0 < y < 1$, $0 < z < 1$, and $x+y+z=1$) or $LiNi_xCo_yMn_zO_2$ (NCM) (wherein $0 < x < 1$, $0 < y < 1$, $0 < z < 1$, and $x+y+z=1$). When the cathode active material includes such a ternary lithium transition metal oxide having a layered rocksalt-type structure, the all-solid secondary battery 1 may have further improved energy density and thermal stability.

The cathode active material may be covered with a coating layer as described above. The coating layer may be any known coating layer for cathode active materials of all-solid secondary batteries. The coating layer may include, for example, $Li_2O—ZrO_2$.

When the cathode active material includes, for example, a ternary lithium transition metal oxide including Ni, such as NCA or NCM, the all-solid secondary battery 1 may have an increased capacity density and elusion of metal ion from the cathode active material may be reduced in a charged state. As a result, the all-solid secondary battery 1 may have improved cycle characteristics in a charged state.

The cathode active material may be in the form of particles having, for example, a true-spherical particle shape or an oval-spherical particle shape. The particle diameter of the cathode active material is not particularly limited, and may be in a range applicable to a cathode active material of an all-solid secondary battery according to the related art. An amount of the cathode active material in the cathode layer 10 is not particularly limited, and may be in a range applicable to a cathode active material of an all-solid secondary battery according to the related art.

The cathode layer 10 may further include, in addition to a cathode active material as described above, an additive(s), for example, a conducting agent, a binder, a filler, a dispersing agent, an auxiliary ionic conducting agent, or the like. The conducting agent may be, for example, graphite, carbon black, acetylene black, Ketjen black, carbon fibers, metal powder, or the like. The binder may be, for example, a styrene-butadiene rubber (SBR), polytetrafluoroethylene (PTFE), polyvinylidene fluoride, polyethylene, or the like. The dispersing agent, the auxiliary ionic conducting agent, a coating agent, or the like which may be added to the cathode layer 10 may be any known materials commonly used in cathode of an all-solid secondary battery.

The cathode layer 10 may further include a solid electrolyte. The solid electrolyte included in the cathode layer 10 may be similar to, or different from, the solid electrolyte included in the solid electrolyte layer 30. As a detailed description of the solid electrolyte of the cathode layer 10, the above-detailed description of the solid electrolyte layer 30 may be referred to.

The solid electrolyte included in the cathode layer 10 may be, for example, a sulfide-based solid electrolyte. This sulfide-based solid electrolyte may be a sulfide-based solid electrolyte which may be used in the solid electrolyte layer 30.

In another embodiment, the cathode layer 10 may be, for example, soaked with a liquid electrolyte. The liquid electrolyte may include a lithium salt and at least one of an ionic liquid and a polymeric ionic liquid. The liquid electrolyte may be non-volatile. The ionic liquid may refer to a salt in a liquid state at room temperature or a fused salt at room temperature, each having a melting point equal to or below the room temperature and consisting of only ions. The ionic liquid may include: at least one cation of an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, or a triazolium cation; and at least one anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $BF_4^-$, $SO_4^-$, $CF_3SO_3^-$, $(FSO_2)_2N^-$, $(C_2F_5SO_2)_2N^-$, $(C_2F_5SO_2)(CF_3SO_2)N^-$, or $(CF_3SO_2)_2N$. The ionic liquid may be, for example, at least one of N-methyl-N-propylpyrrolidium bis(trifluoromethylsulfonyl)imide, N-butyl-N-methylpyrrolidium bis(3-trifluoromethylsulfonyl)imide, 1-butyl-3-methylimidazolium bis(trifluoromethylsulfonyl)imide, or 1-butyl-3-methylimidazolium bis(trifluoromethylsulfonyl)imide). The polymeric ionic liquid may include repeating units including: at least one cation of an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, or a triazolium cation; and at least one anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2$ $N^-$, $Cl^-$, $Br^-$, $I^-$, $SO_4^-$, $CF_3SO_3^-$, $(C_2F_5SO_2)_2N^-$, $(C_2F_5SO_2)$ $(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3—$, $CF_3CF_2(CF_3)_2CO^-$, $(CF_3SO_2)_2CH^-$, $(SF_5)_3C^-$ or $(O(CF_3)_2C_2(CF_3)_2O)_2PO^-$. The lithium salt may be any suitable lithium salt. For example, the lithium salt may be, for example, at least one of $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each independently natural numbers), LiCl, or LiI. A concentration of the lithium salt in the liquid electrolyte may be about 0.1 molar (M) to about 5M. The amount of the liquid electrolyte soaked in the cathode layer 10 may be 0 to about 100 parts by weight, 0 to about 50 parts by weight, 0 to about 30 parts by weight, 0 to about 20 parts by weight, 0 to about 10 parts by weight, or 0 to about 5 parts by weight, with respect to 100 parts by weight of the cathode active material layer 12 in which the liquid electrolyte is not included.

According to another aspect, a method of manufacturing an all-solid secondary battery according to an embodiment includes: providing a solid electrolyte layer 30; disposing, on one surface of the solid electrolyte layer 30, a first anode active material layer 22 including a first metal; disposing, on the first anode active material layer 22, a second anode active material layer 23 including a second metal; and disposing a cathode active material layer 12 on the other surface of the solid electrolyte layer 30. Due to the sequential arrangement of the first anode active material layer 22 and the second anode active material layer 23 on the solid electrolyte layer 30, a short-circuit of the all-solid secondary battery 1 may be suppressed, and cycle characteristics of the all-solid secondary battery 1 may be improved. For example, the all-solid secondary battery 1 according to an embodiment may be manufactured by separately manufacturing the cathode layer, and the solid electrolyte layer 30 on which the first anode active material layer 22 and the second anode active material layer 23 are sequentially disposed, and then stacking these layers upon one another. In an embodiment, a method of manufacturing an all-solid secondary battery includes: providing a solid electrolyte layer 30; disposing, on one surface of the solid electrolyte layer 30, a first anode active material layer 22 including a first metal; disposing, on the first anode active material layer 22, a second anode active material layer 23 including a second metal; and disposing a cathode active material layer 12 on the other surface of the solid electrolyte layer 30, plating a third anode active material layer 24 by charging between the solid electrolyte layer 30 and the first anode active material layer 22, and/or between the first anode active material layer 22 and the second anode active material layer 23, and/or on a surface of the second anode active material layer 23 not contacting the first anode active material 22.

Preparation of Laminate of Solid Electrolyte Layer/Anode Layer

The first anode active material layer may be prepared by coating a first metal on one surface of the solid electrolyte layer by using sputtering, vacuum deposition, or plating. In another embodiment, the first anode active material layer may be prepared by arranging and pressing a foil of a first metal on one surface of the solid electrolyte layer. The pressing may be carried out using, for example, roll pressing, flat pressing, warm isotactic pressing (WIP), or cold isotactic pressing (CIP). However, embodiments are not limited thereto, and any pressing method used in the art may be used. A pressure applied in the pressing may be, for about 50 megapascals (MPa) to about 500 MPa, and the pressing time for which a pressure is applied may be about 5 milliseconds (ms) to about 10 minutes (min). The pressing may be carried out, for example, at a temperature from room temperature (about 20° C.) to about 90° C., or at a temperature from about 20° C. to about 90° C. In another embodiment, the pressing may be carried out at a high temperature of about 100° C. or greater. The second anode active material layer may also be prepared in the same manner as applied to prepare the first anode active material layer, except for using a second metal instead of the first metal. Then, an anode current collector may be disposed on the second anode active material layer and then pressed to thereby form a laminate of the solid electrolyte layer 30 and the anode layer 20. The pressing may be carried out using, for example, roll pressing or flat pressing. However, embodiments are not limited to these methods, and any pressing method used in the art may be used. A pressure applied in the pressing may be, for about 50 MPa to about 500 MPa, and the pressing time for which a pressure is applied may be about 5 ms to about 10 min. The pressing may be carried out, for example, at a temperature from room temperature to about 90° C. or less, or at a temperature from about 20 to about 90° C. In another embodiment, the pressing may be carried out at a high temperature of about 100° C. or greater.

In another embodiment, the second anode active material layer 23 may be prepared using a second anode active material slurry.

For example, second metal particles or a binder, as ingredients of the second anode active material layer 23, may be added to a polar solvent or non-polar solvent to prepare a slurry. The prepared slurry may be coated on the first anode active layer 22 of a first laminate of the solid electrolyte layer 30 and the first anode active material layer 2, and dried to prepare a second laminate. Subsequently, the anode current collector 21 may be disposed on the dried second laminate, and then pressed using a method as described above to thereby prepare a laminate of the solid electrolyte layer 30 and the anode layer 20.

Preparation of Cathode Layer

For example, a cathode active material, a binder, and the like as ingredients of the cathode active material layer 12 may be added to a non-polar solvent to prepare a slurry. The prepared slurry may be coated on the cathode current collector 11 and then dried to form a laminate. The obtained laminate may be pressed to thereby form the cathode layer 10. The pressing may be performed using any method available in the art, not limited to a specific method, for example, roll pressing, flat pressing, or isotactic pressing. The pressing may be omitted. In other embodiments, the cathode layer 10 may be formed by compaction-molding a mixture of the ingredients of the cathode active material layer 12 into pellets or extending the mixture into a sheet form. When these methods are used to form the cathode layer 10, the cathode current collector 11 may be omitted. In another embodiment, the cathode layer 10 may be soaked with a liquid electrolyte before use.

Preparation of Solid Electrolyte Layer

For example, the solid electrolyte layer 30 including an oxide-based solid electrolyte may be prepared by thermally treating precursors of an oxide-based solid electrolyte material.

The oxide-based solid electrolyte may be prepared by contacting the precursors in stoichiometric amounts to form a mixture and thermally treating the mixture. For example, the contacting may include milling such as ball milling, or grinding. The mixture of the precursors mixed in a stoichiometric composition may be subjected to first thermal treatment under oxidizing atmosphere to prepare a first thermal treatment product. The first thermal treatment may be carried out in a temperature range less than about 1000° C. for about 1 to about 36 hours. The first thermal treatment product may be grinded. The first thermal treatment product may be grinded in a wet or dry manner. For example, the wet milling may be carried out by mixing the first thermal treatment product with a solvent such as methanol and milling the mixture using, for example, a ball mill for about 0.5 hour to about 10 hours. The grinded first thermal treatment product may have a particle diameter of about 0.1 $\mu$m to about 10 $\mu$m, or about 0.1 $\mu$m to about 5 $\mu$m. The ground first thermal treatment product may be dried. The grinded first thermal treatment product may be shaped in pellet form by being mixed with a binder solution or may be shaped in pellet form by simply being pressed at a pressure of about 1 ton to about 10 tons.

The shaped product may be subjected to second thermal treatment at a temperature less than 1,000° C. for about 1 hour to about 36 hours. Through the second thermal treatment, the solid electrolyte layer 30, which is a sintered product, may be obtained. The second thermal treatment may be carried out, for example, at a temperature of about 550° C. to about 1,000° C. For example, the first thermal treatment time may be about 1 hour to about 36 hours. The second thermal treatment temperature for obtaining the sintered product may be greater than the first thermal treatment temperature. For example, the second thermal treatment temperature may be greater than the first thermal treatment temperature by about 10° C. or greater, about 20° C. or greater, about 30° C. or greater, or about 50° C. or greater, or about 10° C. to about 75° C., or about 20° C. to about 60° C., or about 30° C. to about 50° C. The second thermal treatment of the shaped product may be carried out under at least one of oxidizing atmosphere and reducing atmosphere. The second thermal treatment may be carried out under an oxidizing atmosphere, a reducing atmosphere, or an oxidizing and reducing atmosphere.

For example, the solid electrolyte layer 30 including a sulfide-based solid electrolyte may be prepared using a solid electrolyte including a sulfide-based solid electrolyte material.

The sulfide-based solid electrolyte may be prepared by treatment of a source material with, for example, melt quenching or mechanical milling. However, embodiments are not limited thereto. Any method of preparing a sulfide-based solid electrolyte available in the art may be used. For example, in the case of using melt quenching, after predetermined amounts of source materials such as $Li_2S$ and $P_2S_5$ are mixed together and then made into pellets, the pellets may be subjected to reaction at a predetermined reaction temperature under vacuum conditions and then quenched to thereby prepare a sulfide-based solid electrolyte. The reaction temperature of the mixture of $Li_2S$ and $P_2S_5$ may be, for example, about 400° C. to about 1,000° C., or about 800° C. to about 900° C. The reaction time may be, for example, about 0.1 hours to about 12 hours, or about 1 hour to about 12 hours. The quenching temperature of the reaction product may be about 10° C. or less or about 0° C. or less, and the quenching rate may be about 1° C./sec to about 10,000° C./sec, or about 1° C./sec to about 1,000° C./sec. For example, in the case of mechanical milling, the source materials such as $Li_2S$ and $P_2S_5$ may be reacted while stirring using, for example, a ball mill, to thereby prepare a sulfide-based solid electrolyte. The stirring rate and stirring time in the mechanical milling are not specifically limited. The greater the stirring rate, the greater the production rate of the sulfide-based solid electrolyte. The longer the stirring time, the greater the rate of conversion of the source material into the sulfide-based solid electrolyte. Then, the mixture of the source materials, obtained by melting quenching or mechanical milling, may be thermally treated at a predetermined temperature and then grinded to thereby prepare a solid electrolyte in the form of particles. When the solid electrolyte has glass transition characteristics, the solid electrolyte may be converted from an amorphous form to a crystalline form by thermal treatment.

The solid electrolyte obtained through a method as described above may be deposited using a film formation method, for example, an aerosol deposition method, a cold spraying method, or a sputtering method, to thereby prepare the solid electrolyte layer 30. In an embodiment, the solid electrolyte layer 30 may be prepared by pressing solid electrolyte particles alone, such that the solid electrolyte layer consists of the solid electrolyte. In an embodiment, the solid electrolyte layer 30 may be formed by mixing a solid electrolyte, a solvent, and a binder together to obtain a mixture, and coating, drying, and then pressing the mixture.

Manufacture of all-Solid Secondary Battery

The cathode layer 10, and the laminate of the anode layer 20 and the solid electrolyte layer 30, which are formed according to the above-described methods, may be stacked such that the solid electrolyte layer 30 is interposed between the cathode layer 10 and the anode layer 20, and then pressed to thereby manufacture the all-solid secondary battery 1.

For example, the laminate of the anode layer 20 and the solid electrolyte layer 30 may be disposed on the cathode layer 10 such that the solid electrolyte layer 30 is in contact with the cathode layer 10, to thereby prepare a second laminate. The second laminate may then be pressed to thereby manufacture the all-solid secondary battery 10. For example, the pressing may be performed by, for example, at least one of roll pressing, flat pressing, or isotactic pressing. However, embodiments are not limited thereto, and any suitable pressing method may be used. A pressure applied in the pressing may be, for about 50 MPa to about 750 MPa, or about 100 MPa to about 600 MPa, or about 200 MPa to about 500 MPa, and the pressing time for which a pressure is applied may be about 5 ms to about 5 min, or about 30 seconds to about 2 min. The pressing may be carried out, for example, at a temperature from room temperature (about 20° C.) to about 90° C., or at a temperature from about 20° C. to about 90° C. In an embodiment, the pressing may be carried out at a high temperature of about 100° C. or greater. Although embodiments of the structures of the all-solid secondary battery 1 and the methods of manufacturing the all-solid secondary battery 1 are described above, the disclosure is not limited thereto, and the constituent members of the all-solid secondary battery and the manufacturing processes may be appropriately varied. The pressing may be omitted.

One or more embodiments of the present disclosure will now be described in detail with reference to the following examples. However, these examples are only for illustrative purposes and are not intended to limit the scope of the one or more embodiments of the present disclosure.

EXAMPLES

Reference Example 1: Li—In Alloy/LLZO/Li Asymmetric Half Cell $Li_{6.5}La_3Zr_{1.5}Ta_{0.5}O_{12}$ (LLZO) pellets having a thickness of 350 um were prepared. An indium (In) foil having a thickness of 50 um and a lithium (Li) foil having a thickness of 20 um were sequentially disposed on one surface of the LLZO pellets, and then pressed using cold isotactic pressing (CIP) at 25° C. by applying a pressure of 250 MPa to attach an In—Li alloy precursor layer to the pellets. The alloy precursor layer-attached LLZO pellets were thermally treated at 150° C. for 5 hours to thereby manufacture a first electrode consisting of an In—Li alloy layer including an In phase and a LiIn alloy phase.

A lithium foil having a thickness of 20 um was disposed on the other surface of the LLZO pellets and then pressed using CIP at 25° C. by applying a pressure of 250 MPa to attach a lithium layer as a second electrode, thereby manufacturing an asymmetric half cell having a structure of the first electrode/solid electrolyte/second electrode.

A copper (Cu) foil current collector was disposed on each of the first electrode and the second electrode, and then the asymmetric half cell was sealed while part of each of the first electrode current collector and the second electrode current collector was protruded out of the asymmetric half cell, and the protruded parts were used as a first electrode terminal and a second electrode terminal, respectively.

Comparative Reference Example 1: Li—Mg Alloy/LLZO/Li Asymmetric Half Cell $Li_{6.5}La_3Zr_{1.5}Ta_{0.5}O_{12}$ (LLZO) pellets having a thickness of 350 um were prepared. A magnesium-lithium alloy (Li 75 wt %-Mg 25 wt %) foil having a thickness of 500 um was disposed on one surface of the LLZO pellets, and then pressed using CIP at 25° C. by applying a pressure of 250 MPa to attach an Mg—Li alloy electrode to the pellets.

A lithium foil having a thickness of 20 um was disposed on the other surface of the LLZO pellets and then pressed using CIP at 25° C. by applying a pressure of 250 MPa to attach a lithium layer as a second electrode, thereby manufacturing an asymmetric half cell having a structure of the first electrode/solid electrolyte/second electrode.

A copper (Cu) foil current collector was disposed on each of the first electrode and the second electrode, and then the asymmetric half cell was sealed while part of each of the first electrode current collector and the second electrode current collector was protruded out of the asymmetric half cell, and the protruded parts were used as a first electrode terminal and a second electrode terminal, respectively.

Reference Example 2: Li—In Alloy/LLZO/NCM Full Cell

Preparation of Laminate of Solid Electrolyte Layer/Anode Layer $Li_{6.5}La_3Zr_{1.5}Ta_{0.5}O_{12}$ (LLZO) pellets having a thickness of 350 um were prepared. An indium (In) foil having a thickness of 50 μm and a lithium (Li) foil having a thickness of 20 μm were sequentially disposed on one surface of the LLZO pellets, and then pressed using cold isotactic pressing (CIP) at 25° C. by applying a pressure of 250 MPa to attach an In—Li alloy precursor layer to the pellets. The alloy precursor layer-attached LLZO pellets were thermally treated at 150° C. for 5 hours to thereby manufacture an anode consisting of an In—Li alloy layer including an In phase and a LiIn alloy phase.

An anode current collector consisting of a SUS304 thin film having a thickness of 10 μm was disposed on the In—Li alloy layer electrode and then pressed using CIP at 25° C. by applying a pressure of 250 MPa to attach the anode current collector, thereby preparing a laminate of solid electrolyte layer/anode layer.

Preparation of Cathode Layer $LiNi_{0.8}Co_{0.15}Mn_{0.05}O_2$ (NCM) was prepared as a cathode active material. In addition, a polytetrafluoroethylene (PTFE) binder (Teflon™, available from DuPont) was prepared. Carbon nanotube fibers (CNF) were prepared as a conducting agent. Then, the cathode active material, the conducting agent, and the binder were mixed in a mass ratio of 100:2:1. The mixture was stretched in the form of a sheet to prepare a cathode active material sheet. This cathode active material sheet was pressed onto a cathode current collector consisting of an aluminum foil having a thickness of 18 μm to form a cathode layer.

The cathode anode active material layer of the formed cathode layer was soaked with a liquid electrolyte including 2.0M LiFSI dissolved in ionic liquid Pyr13FSI (N-propyl-N-methyl-pyrrolidinium bis(fluorosulfonyl)imide).

Manufacture of all-Solid Secondary Battery

The cathode layer was disposed such that the cathode active material layer soaked with the liquid electrolyte faced toward an upper end in the SUS cap. The laminate of solid electrolyte layer/anode layer was disposed such that the solid electrolyte layer was placed on the cathode active material layer, and then sealed to manufacture an all-solid secondary battery.

The cathode layer and the anode layer were insulated using an insulator. Part of each of the cathode current collector and the anode current collector was protruded out of the sealed battery and used as a cathode terminal and an anode terminal, respectively.

Comparative Reference Example 2: Li—Mg Alloy/LLZO/NCM Full Cell

Prepare of Laminate of Solid Electrolyte Layer/Anode Layer $Li_{6.5}La_3Zr_{1.5}Ta_{0.5}O_{12}$ (LLZO) pellets having a thickness of 350 μm were prepared. After a magnesium-lithium alloy (Li 75 wt %-Mg 25 wt %) foil having a thickness of 500 μm was disposed on one surface of the LLZO pellets, an anode current collector consisting of a copper thin film having a thickness of 10 μm was disposed on the Mg—Li alloy anode layer, and then pressed using CIP at 25° C. by applying a pressure of 250 MPa to attach the anode current collector, thereby manufacturing a laminate of solid electrolyte layer/anode layer.

(Manufacture of Cathode Layer and all-Solid Secondary Battery)

A cathode layer and an all-solid secondary battery were manufactured in the same manner as in Reference Example 2, except that the prepared laminate of solid electrolyte layer/anode layer was used.

Example 1: First Layer (In, 50 um)/Second Layer (Ag, 100 nm) Multilayer Structure Preparation of Laminate of Solid Electrolyte Layer/Anode Layer $Li_{6.5}La_3Zr_{1.5}Ta_{0.5}O_{12}$ (LLZO) pellets having a thickness of 350 um were prepared. An indium (In) foil having a thickness of 50 μm was disposed on one surface of the LLZO pellets and then pressed using CIP at 25° C. by applying a pressure of 250 MPa to attach the indium (In) metal layer as a first anode active material layer. A silver (Ag) layer having a thickness of 100 nm as a second anode active material layer was coated on the In metal layer by sputtering. An anode current collector consisting of a copper (Cu) foil having a thickness of 10 μm was disposed on the silver (Ag) layer and then pressed using CIP at 25° C. by applying a pressure of 250 MPa to attach the anode current collector, thereby preparing a laminate of solid electrolyte layer/anode layer.

Preparation of Cathode Layer $LiNi_{0.8}Co_{0.15}Mn_{0.05}O_2$ (NCM) was prepared as a cathode active material. In addition, a polytetrafluoroethylene (PTFE) binder (Teflon (registered trademark) binder, available from DuPont) was prepared. Carbon nanotube fibers (CNF) were prepared as a conducting agent. Then, the cathode active material, the conducting agent, and the binder were mixed in a mass ratio of 100:2:1. The mixture was stretched in the form of a sheet to prepare a cathode active material sheet. This cathode active material sheet was pressed onto a cathode current collector consisting of an aluminum foil having a thickness of 18 μm to form a cathode layer.

The cathode anode active material layer of the formed cathode layer was soaked with a liquid electrolyte including 2.0 M LiFSI dissolved in ionic liquid Pyr13FSI (N-propyl-N-methyl-pyrrolidinium bis(fluorosulfonyl)imide).

Manufacture of all-Solid Secondary Battery

The cathode layer was disposed such that the cathode active material layer soaked with the liquid electrolyte faced toward an upper end in the SUS cap. The laminate of solid electrolyte layer/anode layer was disposed such that the solid electrolyte layer was placed on the cathode active material layer, and then sealed to manufacture an all-solid secondary battery.

The cathode layer and the anode layer were insulated using an insulator. Part of each of the cathode current collector and the anode current collector was protruded out of the sealed battery and used as a cathode terminal and an anode terminal, respectively.

Comparative Example 1: First Layer (In, 50 μm) Single-Layer Structure

An all-solid secondary battery was manufactured in the same manner as in Example 1, except that the step of coating a silver (Ag) metal layer having a thickness of 100 nm as a second anode active material layer was omitted, and only an indium (In) metal layer having a thickness of 50 μm was coated as a first anode active material layer.

Comparative Example 2: Second Layer (Ag, 100 nm) Single-Layer Structure

An all-solid secondary battery was manufactured in the same manner as in Example 1, except that the step of coating an indium (In) metal layer having a thickness of 50 um as a first anode active material layer was omitted, and only a silver (Ag) layer having a thickness of 100 nm as a second anode active material layer was coated on one surface of the LLZO pellets.

Comparative Example 3: First Layer (Ag, 100 nm)/Second Layer (In, 50 μm) Multilayer Structure An all-solid secondary battery was manufactured in the same manner as in Example 1, except that a silver (Ag) metal layer having a thickness of 100 nm as a first anode active material layer was first coated on one surface of LLZO ($Li_{6.5}La_3Zr_{1.5}Ta_{0.5}O_{12}$) pellets, and then an indium (In) metal layer having a thickness of 50 μm as a second anode active material layer was coated to form a structure of solid electrolyte/silver layer/indium layer.

Example 2: First Layer (In, 50 μm)/Second Layer (Ag+FB, 5 μm)

Preparation of Laminate of Solid Electrolyte Layer/Anode Layer

LLZO ($Li_{6.5}La_3Zr_{1.5}Ta_{0.5}O_{12}$) pellets having a thickness of 350 μm were prepared. An indium (In) foil having a thickness of 50 μm was disposed on one surface of the LLZO pellets and then pressed using CIP at 25° C. by applying a pressure of 250 MPa to attach the indium (In) metal layer as a first anode active material layer.

Furnace black (FB) having a primary particle diameter of about 30 nm and silver (Ag) particles having an average particle diameter of about 60 nm were prepared as a second anode active material. 3 g of the furnace black (RB) and 1 g of the silver particles were put into a container, and 4 g of an NMP solution including 5 wt % of a PVDF binder (#9300, available from KUREHA) was added thereto to prepare a mixed solution. Subsequently, the mixed solution was stirred while adding NMP little by little thereto to thereby prepare a slurry. The prepared slurry was applied onto an indium (In) metal layer using a blade coater, dried in the air at 80° C. for 20 minutes and then dried under vacuum at 100° C. for 12 hours to thereby prepare a second anode active material layer. The second anode active material layer had a thickness of about 5 μm.

An anode current collector consisting of a SUS304 thin film having a thickness of 10 μm was disposed on the second anode active material layer and then pressed using CIP at 25° C. by applying a pressure of 250 MPa to attach the anode current collector, thereby preparing a laminate of solid electrolyte layer/anode layer.

Preparation of Cathode Layer $LiNi_{0.8}Co_{0.15}Mn_{0.05}O_2$(NCM) was prepared as a cathode active material. In addition, a polytetrafluoroethylene (PTFE) binder (Teflon (registered trademark) binder, available from DuPont) was prepared. Carbon nanotube fibers (CNF) were prepared as a conducting agent. Then, the cathode active material, the conducting agent, and the binder were mixed in a mass ratio of 100:2:1. The mixture was stretched in the form of a sheet to prepare a cathode active material sheet. This cathode active material sheet was pressed onto a cathode current collector consisting of an aluminum foil having a thickness of 18 μm to form a cathode layer.

The cathode anode active material layer of the formed cathode layer was soaked with a liquid electrolyte including 2.0M LiFSI dissolved in ionic liquid Pyr13FSI (N-propyl-N-methyl-pyrrolidinium bis(fluorosulfonyl)imide).

Manufacture of all-Solid Secondary Battery

The cathode layer was disposed such that the cathode active material layer soaked with the liquid electrolyte faced toward an upper end in the SUS cap. The laminate of solid electrolyte layer/anode layer was disposed such that the solid electrolyte layer was placed on the cathode active material layer, and then sealed to manufacture an all-solid secondary battery. The cathode layer and the anode layer were insulated using an insulator. Part of each of the cathode current collector and the anode current collector was protruded out of the sealed battery and used as a cathode terminal and an anode terminal, respectively.

Example 3: First Layer (Li—In Alloy, 40 μm)/Second Layer (Au, 100 nm) Multilayer Structure An all-solid secondary battery was manufactured in the same manner as in Example 1, except that a lithium indium alloy (Li—In alloy) foil having a thickness of 40 um, instead of the indium (In) foil having a thickness of 50 μm, was used as the first anode active material layer, and a gold (Au) metal layer having a thickness of 100 nm, instead of the silver (Ag) metal layer having a thickness of 100 nm, was used as the second anode active material layer.

Example 4: First Layer (Li—In Alloy, 40 μm)/Second Layer (Ag, 20 nm) Multilayer Structure An all-solid secondary battery was manufactured in the same manner as in Example 1, except that a lithium indium alloy (LiIn) foil having a thickness of 40 um, instead of the indium (In) foil having a thickness of 50 μm, was used as the first anode active material layer, and a silver (Ag) metal layer having a thickness of 20 nm, instead of the silver (Ag) metal layer having a thickness of 100 nm, was used as the second anode active material layer.

Evaluation Example 1: Interface Stability Evaluation

The first electrode (anode) of each of the asymmetric cells manufactured in Reference Example 1 and Comparative Reference Example 1 was charged at 60° C. with a current of 0.2 $mA/cm^2$ for 2 hours.

The asymmetric cell of Reference Example 1 was stably maintained at a voltage of 0.2V or greater during the charging.

Meanwhile, the asymmetric cell of Comparative Reference Example 1 had an initial charge potential of 0.005 V, and short-circuited after 40 minutes from the start of charging and could no longer be charged.

After completion of the charging, cross-sections of the asymmetric cells of Reference Example 1 and Comparative Reference Example 1 were analyzed using scanning electron microscopy to observe the interface between the solid electrolyte and the first electrode (anode).

Figure 5A:
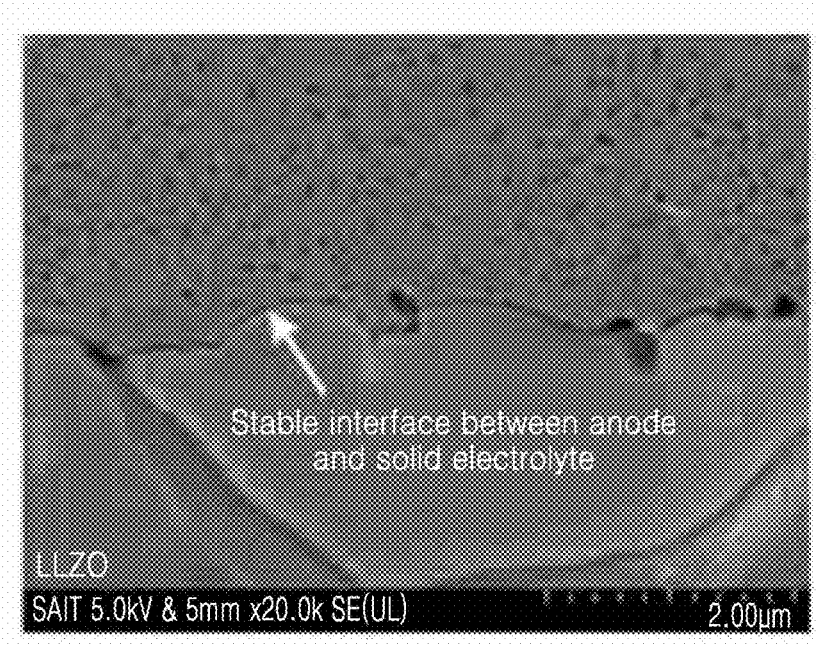
FIG. 5A is a scanning electron microscope (SEM) image of a cross-section of an all-solid secondary battery manufactured in accordance with Reference Example 1.

As shown in FIG. 5A, the interface between the first electrode (anode) and the solid electrolyte in the asymmetric cell of Reference Example 1 was maintained stable without decomposition reaction of the solid electrolyte.

During charging, the first electrode as an indium-lithium alloy included in the asymmetric cell of Reference Example 1 maintained a lithium-ion reduction potential of about 0.2V (vs. $Li/Li^+$) or greater (greater than a reduction potential of LLZO, i.e., than about 0.05V (vs. Li) at which reductive decomposition reaction of the solid electrolyte begins) and decomposition of the solid electrolyte was suppressed.

Figure 5B:
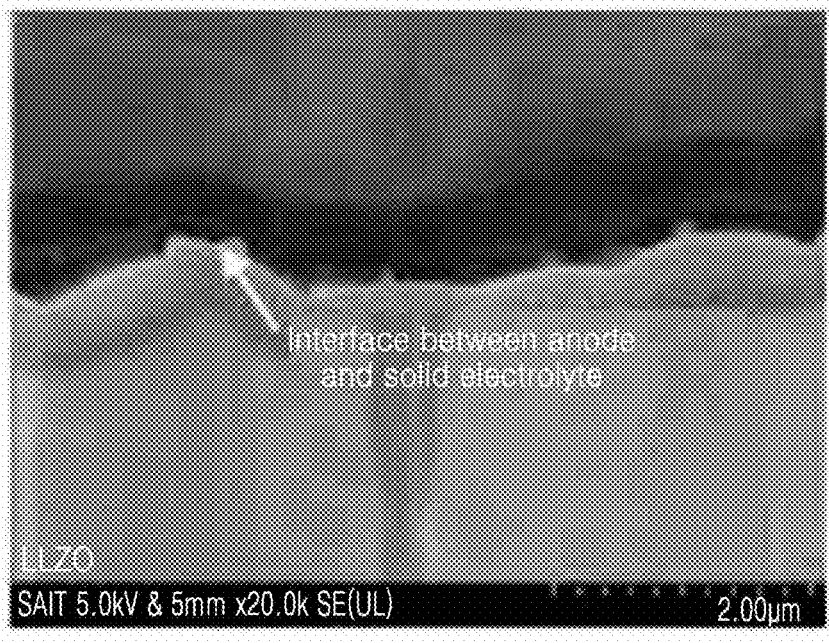
FIG. 5B is a SEM image of a cross-section of the all-solid secondary battery manufactured in Comparative Reference Example 1.

Meanwhile, as shown in FIG. 5B, in the interface between the first electrode (anode) and the solid electrolyte in the asymmetric cell of Comparative Reference Example 1, a shaded portion was observed due to the decomposition reaction of the solid electrolyte.

During charging, the first electrode as a magnesium-lithium alloy included in the asymmetric cell of Comparative Reference Example 1 maintained a lithium-ion reduction potential of about 0.02 V (vs. $Li/Li^+$) (less than a reduction potential of LLZO, i.e., less than about 0.05 V (vs. Li) at which reductive decomposition reaction of the solid electrolyte begins), and decomposition of the solid electrolyte occurred.

Evaluation Example 2: Interfacial Resistance Evaluation

The interfacial resistance of the full cells manufactured in Reference Example 2 and Comparative Reference Example 2 were measured at the initial state and after 100 hours.

The impedance of the pellets of the full cells manufactured in Reference Example 2 and Comparative Reference Example 2 was measured using an impedance analyzer (Solartron 1400A/1455A impedance analyzer) according to a 2-probe method. The frequency range was 0.1 Hz to 1 MHz, and the amplitude voltage was 10 millivolts (mV).

The impedance measurement was carried out at 25° C. in the air atmosphere. Nyquist plots as the results of the impedance measurement are shown in FIGS. 6A and 6B.

Figure 6A:
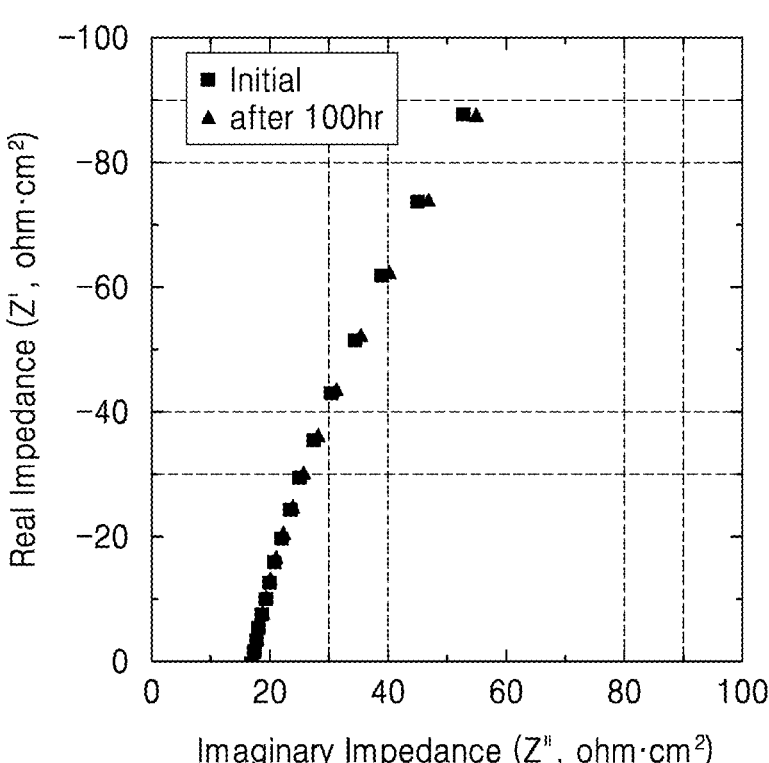
FIG. 6A is a Nyquist plot of real impedance (Z', ohms per square centimeter (ohm·cm$^2$) versus imaginary impedance (Z", ohm/cm$^2$), showing impedance measurement results of the all-solid secondary battery manufactured in Reference Example 2.

Referring to FIG. 6A, the full cell of Reference Example 2 was found to have no change in resistance of the solid electrolyte even after 100 hours passed.

Figure 6B:
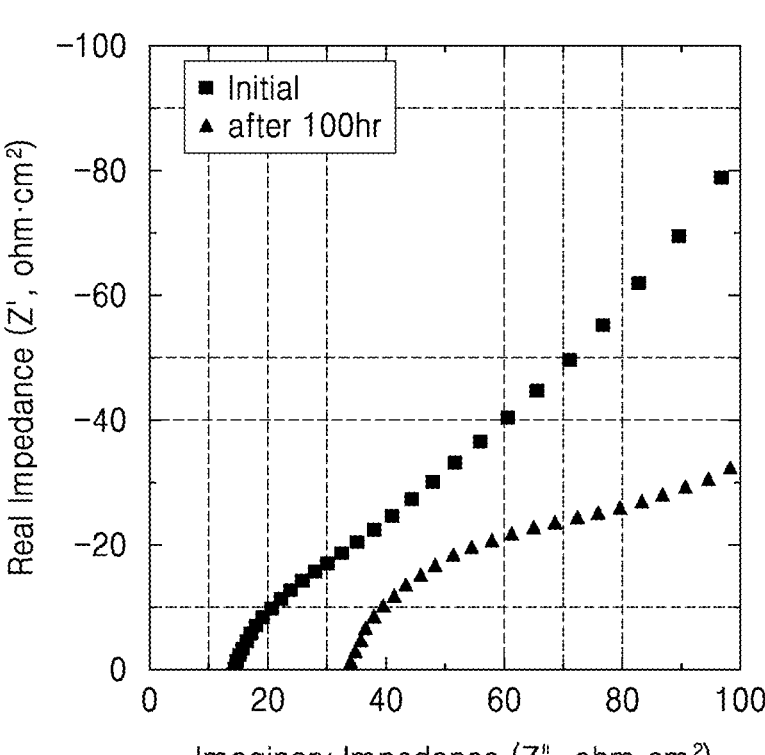
FIG. 6B is a Nyquist plot of real impedance (Z', ohm·cm$^2$) versus imaginary impedance (Z", ohm·cm$^2$), showing impedance measurement results of the all-solid secondary battery manufactured in Comparative Reference Example 2.

Meanwhile, as shown in FIG. 6B, in the full cell of Comparative Reference Example 2, after 100 hours, the resistance of the solid electrolyte was increased by about 100% or greater, from 13 ohms·square centimeter (ohm·cm²) to 33 ohm·cm².

Therefore, in the full cell of Comparative Reference Example 2, using the anode having a lithium ion-reduction potential which is less than the reduction potential of the solid electrolyte, the resistance was increased due to the reductive decomposition reaction of the solid electrolyte.

However, in the full cell of Reference Example 2, using the anode having a lithium-ion reduction potential greater than the reduction potential of the solid electrolyte, there was no change in resistance due to the stable solid electrolyte.

Evaluation Example 3: Charge-Discharge Test (I)

The charge and discharge characteristics of the all-solid secondary batteries manufactured in Reference Example 2 and Comparative Reference Example 2 were evaluated according to a charge-discharge test as follows. The charge-discharge test of the all-solid secondary batteries was carried out in a 60° C. -thermostat.

Charging and discharging conditions in the first cycle were set so as to charge each battery with a constant current of 0.3 mA/cm² until a battery voltage reached 4.2V and then discharge the same with a constant current of 0.3 mA/cm² until the battery voltage reached 2.8V.

Figure 6C:
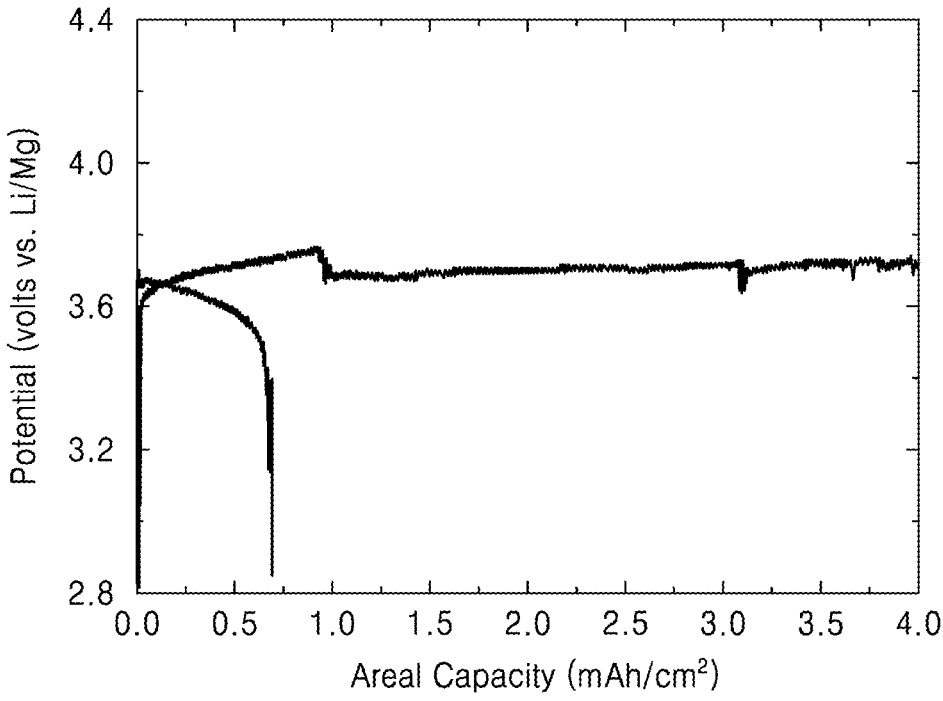
FIG. 6C is a graph of potential (volts versus Li/Mg) versus areal capacity (milliampere hours per square centimeter (mAh/cm$^2$)), which shows the charge-discharge profile of the all-solid secondary battery manufactured in Comparative Reference Example 2.

However, as show in FIG. 6C, the all-solid secondary battery of Comparative Reference Example 2 shows a short-circuit occurred during the charging at the first cycle.

Therefore, in the full cell of Comparative Reference Example 2, using the anode having a lithium-ion reduction potential which is less than the reduction potential of the solid electrolyte, it was found that the reductive decomposition of the solid electrolyte occurred and consequentially stable operation of the battery was not possible.

In the all-solid secondary battery of Reference Example 2, although not shown, charging and discharging were possible without a short circuit, under the same charging and discharging conditions as those applied to the full cell of Comparative Reference Example 2 (i.e., with a current of 0.3 mA/cm²) and under the varied conditions of a charge/discharge current of 0.5 mA/cm² and 1.0 mA/cm².

Therefore, in the full cell of Reference Example 2, using the anode having a lithium-ion reduction potential greater than the reduction potential of the solid electrolyte, it was found that the reductive decomposition reaction of the solid electrolyte was suppressed, and consequentially stable operation of the battery was possible.

Evaluation Example 4: Charge-Discharge Test (II)

The charge and discharge characteristics of the all-solid secondary batteries manufactured in Examples 1 and 2 and Comparative Example 1 to 3 were evaluated according to a charge-discharge test as follows. The charge-discharge test of the all-solid secondary batteries was carried out in a 60° C. -thermostat.

In the first cycle, charging was carried out with a constant current of 0.3 mA/cm² until a battery voltage of 3.6 V or 4.2 V was reached, and subsequently, discharging was carried out with a constant current of 0.3 mA/cm² until a battery voltage of 2.2 V was reached.

In the second cycle, charging was carried out with a constant current of 0.5 mA/cm² until a battery voltage of 3.6 V or 4.2 V was reached, and subsequently, discharging was carried out with a constant current of 0.5 mA/cm² until a battery voltage of 2.2 V was reached.

In the third cycle, charging was carried out with a constant current of 0.7 mA/cm² until a battery voltage of 3.6 V or 4.2 V was reached, and subsequently, discharging was carried out with a constant current of 0.7 mA/cm² until a battery voltage of 2.2 V was reached.

In the fourth cycle, charging was carried out with a constant current of 1.0 mA/cm² until a battery voltage of 3.6 V or 4.2 V was reached, and subsequently, discharging was carried out with a constant current of 1.0 mA/cm² until a battery voltage of 2.2V was reached.

Figure 7A:
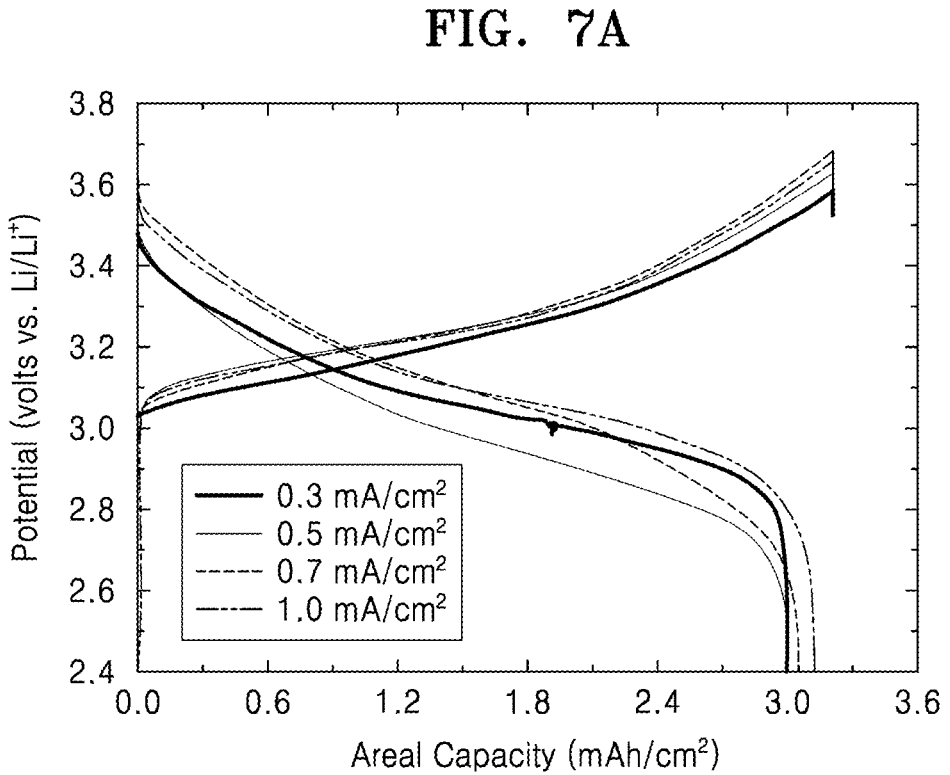
FIG. 7A is graph of potential (volts versus Li/Li$^+$) versus areal capacity (mAh/cm$^2$), which shows a charge-discharge profile of an all-solid secondary battery manufactured in Example 1.

Some of the charge-discharge test results are shown in FIGS. 7A, 7B, 7C, and 7D As shown in FIG. 7A, the all-solid secondary battery of Example 1, due to having the first anode active material layer being in contact with the solid electrolyte layer and having a lithium-ion reduction potential greater than the reductive decomposition potential of the solid electrolyte, and including, on the first anode active material layer, the second anode active material layer having a greater solid solubility of lithium than that of the first anode active material layer, exhibited stable charge and discharge characteristics in the entire constant current ranges without capacity reduction, having excellent high-rate characteristics.

That is, the results are considered to attribute to the followings: since the first anode active material layer maintains stable interface, while suppressing the decomposition reaction of the solid electrolyte, and has a low solid solubility of lithium and a high lithium ion diffusivity, the lithium introduced into the first anode active material layer may rapidly diffuse into the interface between the first anode active material layer and the second anode active material layer, so that a localized increase in lithium concentration in the interface between the solid electrolyte and the first anode active material layer may be suppressed, and the lithium diffused into the interface between the first anode active material layer and the second anode active material layer may easily be dissolved into the second anode active material layer having a high solid solubility of lithium, thus inducing deposition of lithium between the second anode active material layer and the anode current collector.

Figure 8A:
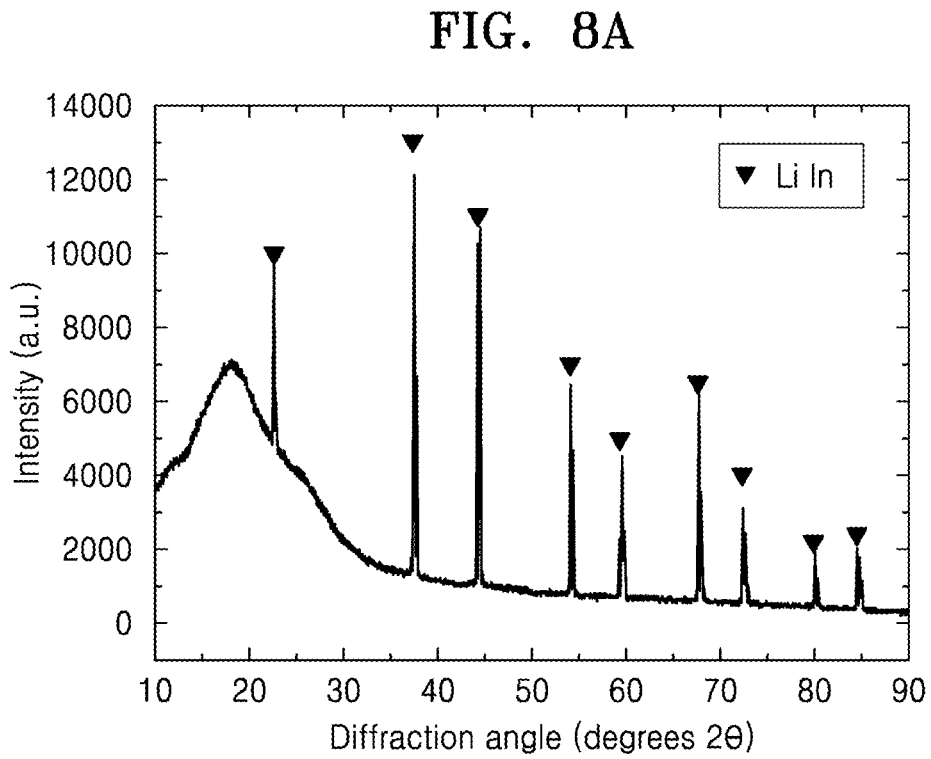
FIG. 8A is a graph of intensity (arbitrary units, a.u.) versus diffraction angle (degrees two-theta (2$\theta$)), showing an X-ray diffraction (XRD) spectrum of anode active material powder separated from the all-solid secondary battery manufactured in Example 1 after termination of charging and discharging of the all-solid secondary battery.

As shown in FIG. 8A, as a result of analysis of the anode surface using X-ray diffractometry (XRD) after disassembly of the all-solid secondary battery of Example 1 after completion of the fourth cycle of charging and discharging, the first anode active material layer was found to include a LiIn phase. That is, it was found that excess lithium was dissolved into the silver (Ag) layer as the second anode active material layer having a high solid solubility of lithium.

Figure 7B:
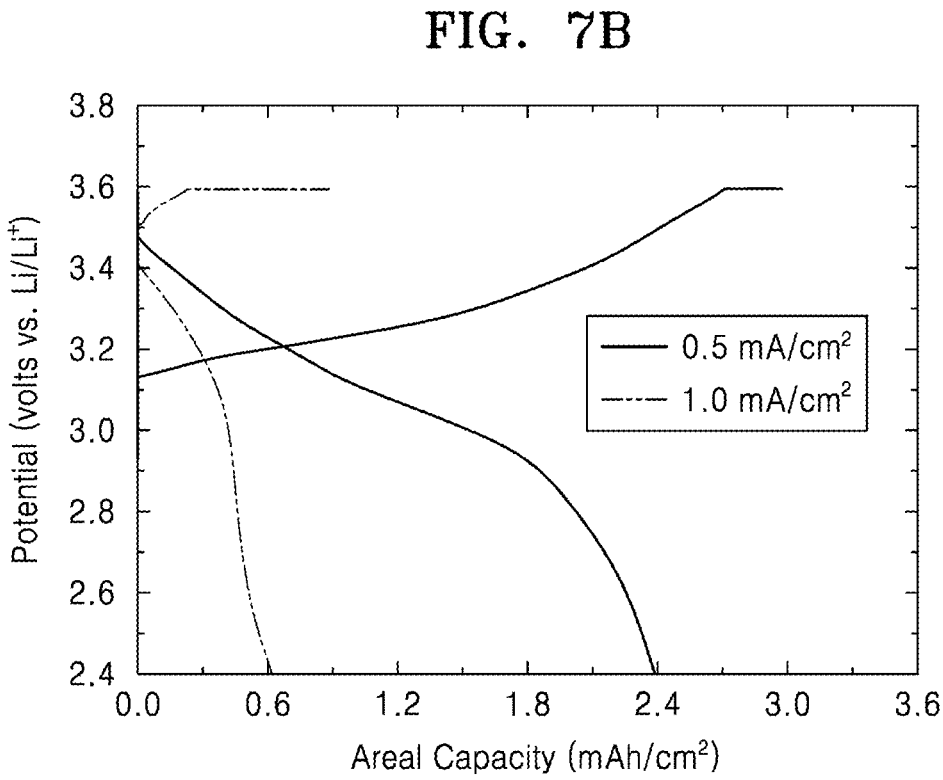
FIG. 7B is graph of potential (volts versus Li/Li$^+$) versus areal capacity (mAh/cm$^2$), which shows a charge-discharge profile of the all-solid secondary battery manufactured in Comparative Example 1.

As shown in FIG. 7B, in the all-solid secondary battery of Comparative Example 1, due to having only the first anode active material layer (In layer), decomposition of the solid electrolyte was suppressed and a short-circuit did not occur.

However, in the all-solid secondary battery of Comparative Example 1, due to having no second anode active material layer (Ag layer), the lithium introduced into the first anode active material layer was not able to additionally diffuse into another layer, and thus was deposited to be ununiform in the first anode active material layer, and isolated within the first anode active material layer, thus leading to a rapid reduction in high-rate discharge capacity.

Figure 8B:
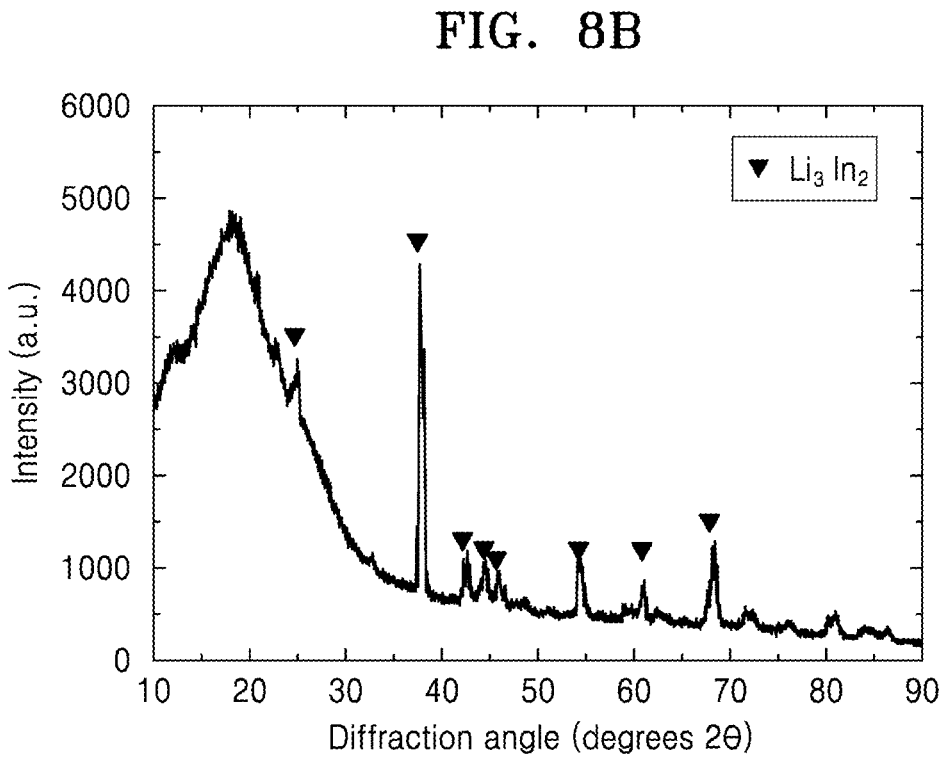
FIG. 8B is a graph of intensity (arbitrary units, a.u.) versus diffraction angle (degrees 2$\theta$), showing an XRD spectrum of anode active material powder separated from the all-solid secondary battery manufactured in Comparative Example 1 after termination of charging and discharging of the all-solid secondary battery.

As shown in FIG. 8B, as a result of analysis of the anode surface using XRD after disassembly of the all-solid secondary battery of Comparative Example 1 after completion of the fourth cycle of charging and discharging, the first anode active material layer was found to include a $Li_3In_2$ phase.

As a result of analysis of the composition of the first anode active material layer of the all-solid secondary battery of Comparative Example 1 after completion of charging at the second cycle, the first node active material layer was found to include 27 at % of Li, and 73 at % of In.

Figure 7C:
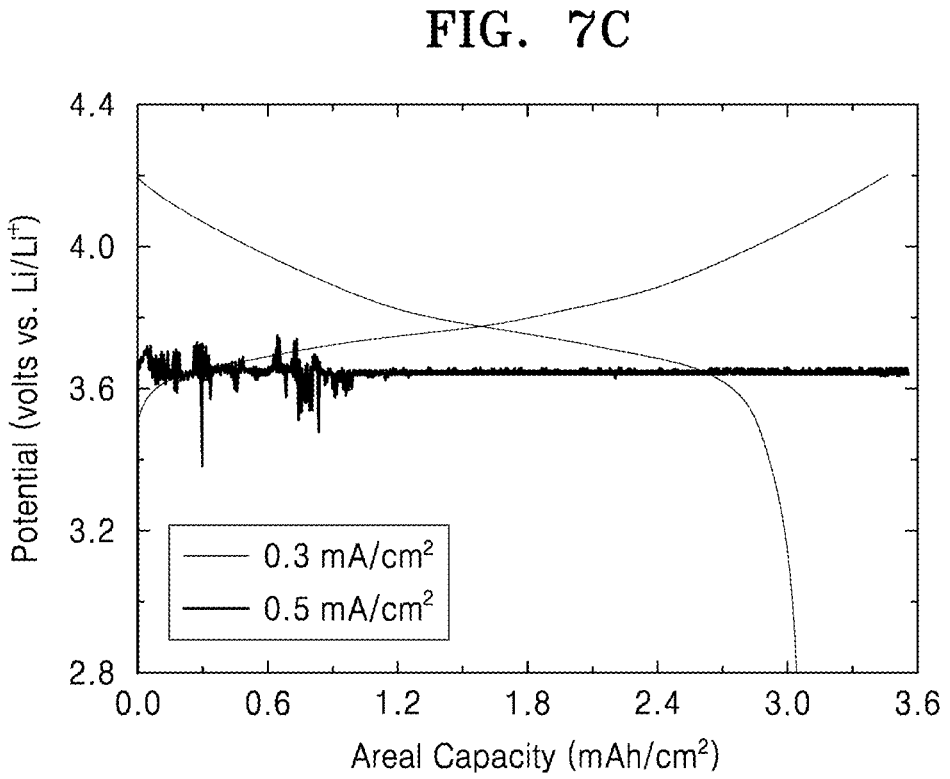
FIG. 7C is graph of potential (volts versus Li/Li$^+$) versus areal capacity (mAh/cm$^2$), which shows a charge-discharge profile of the all-solid secondary battery manufactured in Comparative Example 2.

As shown in FIG. 7C, in the all-solid secondary battery of Comparative Example 2, due to having only the second anode active material layer (Ag layer), a short-circuit occurred at the second cycle, though normal charging and discharging was possible at the first cycle.

As a result of analysis of the composition of the second anode active material layer of the all-solid secondary battery of Comparative Example 2 after completion of charging at the first cycle, the second node active material layer was found to include 99 at % of Li, and 1 at % of Ag.

Figure 7D:
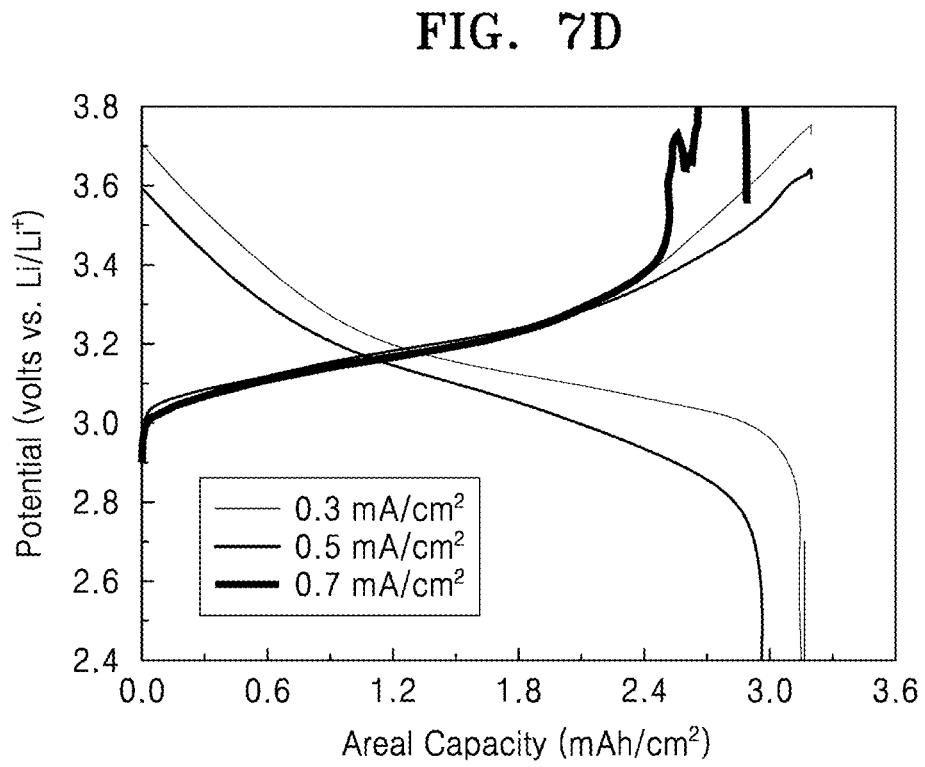
FIG. 7D graph of potential (volts versus Li/Li$^+$) versus areal capacity (mAh/cm$^2$), which shows a charge-discharge profile of the all-solid secondary battery manufactured in Comparative Example 3.

As shown in FIG. 7D, in the all-solid secondary battery of Comparative Example 3 using silver (Ag) in the first anode active material layer and indium (In) in the second anode active material layer, due to the use of the silver (Ag) layer having a high solid solubility of lithium as the first anode active material layer, deposition of lithium occurred in the interface between the solid electrolyte and the anode, not in the second anode active material layer (In layer), thus causing a short-circuit at the third cycle.

Although not shown, the all-solid secondary battery of Example 2 exhibited stable charge and discharge characteristics.

Figure 7E:
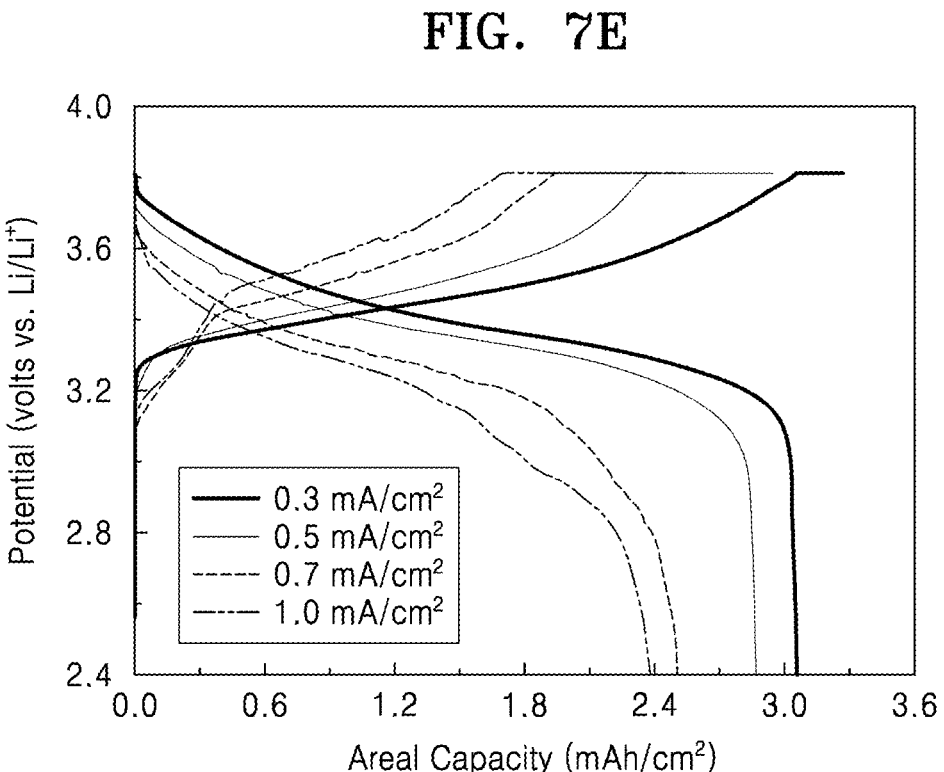
FIG. 7E graph of potential (volts versus Li/Li$^+$) versus areal capacity (mAh/cm$^2$), which shows a charge-discharge profile of the all-solid secondary battery manufactured in Example 3.

As shown in FIG. 7E, the all-solid secondary battery of Example 3 also exhibited stable charge and discharge characteristics.

Figure 7F:
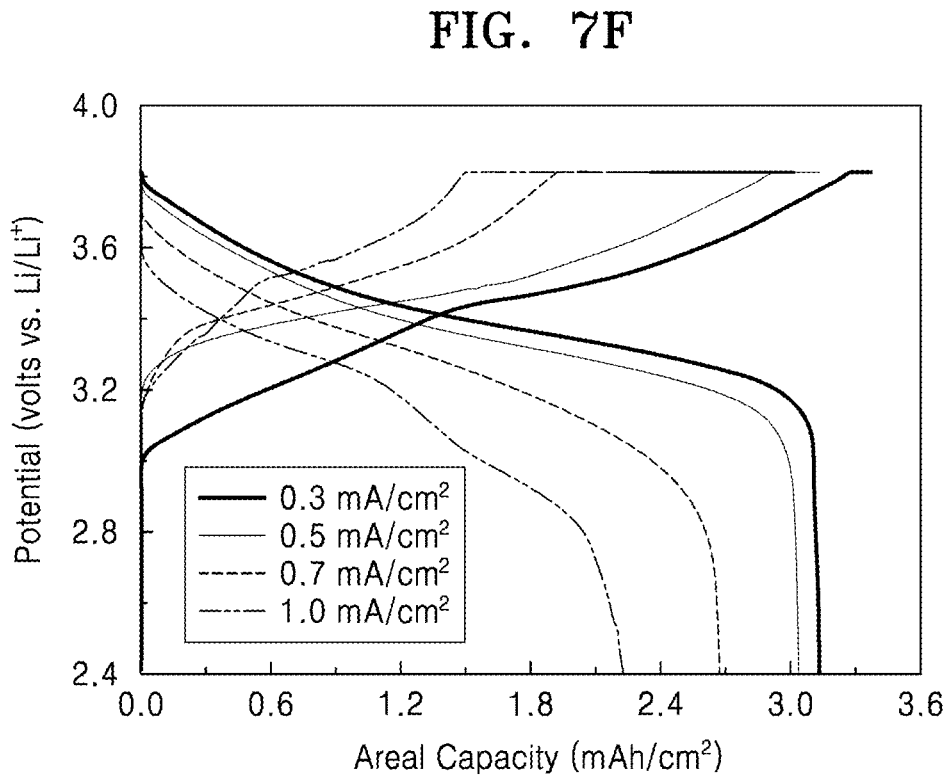
FIG. 7F graph of potential (volts versus Li/Li$^+$) versus areal capacity (mAh/cm$^2$), which shows a charge-discharge profile of the all-solid secondary battery manufactured in Example 4.

As shown in FIG. 7F, the all-solid secondary battery of Example 4 also exhibited stable charge and discharge characteristics.

As described above, the all-solid secondary battery according to any of the above-described embodiments may be applied to various portable devices or vehicles.

As described above, according to an aspect, an all-solid secondary battery capable of preventing a short-circuit and having excellent cycle characteristics may be provided by using an anode layer having a multilayer structure.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An all-solid secondary battery comprising:
a cathode layer comprising a cathode active material;
an anode layer; and
a solid electrolyte layer comprising a solid electrolyte and disposed between the cathode layer and the anode layer,
wherein the anode layer comprises
   an anode current collector,
   a first anode active material layer in contact with the solid electrolyte layer, and
   a second anode active material layer disposed between the anode current collector and the first anode active material layer,
wherein the first anode active material layer comprises a first metal, and the first metal has a lithium-ion reduction potential greater than a reduction potential of the solid electrolyte, and
wherein the second anode active material layer comprises a second metal, and a solid solubility of lithium in the second metal is greater than a solid solubility of lithium in the first metal,
wherein the first metal comprises indium,
wherein the second metal comprises at least one of silver, gold, platinum, palladium, silicon, aluminum, bismuth, magnesium, tin, or zinc,
wherein a lithium ion diffusivity at 25° C. of the first anode active material layer is equal to or greater than a lithium ion diffusivity at 25° C. of the second anode active material layer, and
the first anode active material layer has a lithium ion diffusivity at 25° C. of about $1 \times 10^{-16}$ square centimeters per second to about $1 \times 10^{-3}$ square centimeters per second.

2. The all-solid secondary battery of claim 1, wherein the first anode active material layer has a lithium-ion reduction potential of about 0.05 volts to about 2.5 volt with respect to lithium.

3. The all-solid secondary battery of claim 1, wherein a difference between the solid solubility of lithium in the second metal and the solid solubility of lithium in the first metal is about 10 atomic percent or greater.

4. The all-solid secondary battery of claim 1, wherein the second metal has a Mohs hardness equal to or greater than a Mohs hardness of the first metal, and
the Mohs hardness of the first metal is equal to or greater than a Mohs hardness of lithium.

5. The all-solid secondary battery of claim 1, wherein the first metal further comprises silicon, gallium, tin, aluminum, titanium, zirconium, niobium, germanium, antimony, bismuth, zinc, gold, platinum, palladium, iron, cobalt, chromium, cesium, cerium, or lanthanum.

6. The all-solid secondary battery of claim 1, wherein at least one of the first anode active material layer and the second anode active material layer comprises an anode active material in a form of a film.

7. The all-solid secondary battery of claim 6, wherein
the first anode active material layer comprises at least one of the first metal, lithium, or an alloy of the first metal and lithium, and
the second anode active material layer comprises at least one of a second metal, lithium, or an alloy of the second metal and lithium.

8. The all-solid secondary battery of claim 1, wherein a thickness of at least one of the first anode active material layer or the second anode active material layer is about 50% or less of a thickness of the cathode active material layer, and the thickness of the at least one of the first anode active material layer or the second anode active material layer is about 10 nanometers to about 100 micrometers.

9. The all-solid secondary battery of claim 8, wherein the thickness of the at least one of the first anode active material layer or the second anode active material layer is about 10 nanometers to about 500 nanometers.

10. The all-solid secondary battery of claim 1, wherein at least one of the first anode active material layer or the second anode active material layer comprises an anode active material in a form of a plurality of particles, and a binder.

11. The all-solid secondary battery of claim 10, wherein the plurality of particle has an average particle diameter of about 4 micrometers or less.

12. The all-solid secondary battery of claim 10, wherein the anode active material in the form of particles comprises at least one of amorphous carbon, a metal, or a metalloid, and wherein the first metal and the second metal each independently comprise the amorphous carbon, metal, or the metalloid, and are different.

13. The all-solid secondary battery of claim 12, wherein the anode active material in the form of particles comprises a mixture of first particles consisting of amorphous carbon and second particles consisting of the metal, the metalloid, or a combination thereof, and an amount of the second particles is about 8 weight percent to about 60 weight percent, based on a total weight of the mixture.

14. The all-solid secondary battery of claim 10, wherein at least one of the first anode active material layer and the second anode active material layer has a thickness of about 1 micrometer to about 20 micrometers.

15. The all-solid secondary battery of claim 1, further comprising a third anode active material layer disposed between the anode current collector and the second anode active material layer, or between the first anode active material layer and the second anode active material layer, or between the solid electrolyte layer and the first anode active material layer and wherein the third anode active material layer comprises lithium or a lithium alloy.

16. The all-solid secondary battery of claim 15, wherein a thickness of the first anode active material layer is about 5 percent to about 150 percent of a thickness of the third anode active material layer, wherein the thickness of the first anode active material layer and the thickness of the third anode active material layer are determined in a charged state.

17. The all-solid secondary battery of claim 1, wherein the anode current collector, the first anode active material layer, the second anode active material layer, and regions therebetween are each a lithium free region which do not include lithium in an initial state or in a post discharge state of the all-solid secondary battery.

18. The all-solid secondary battery of claim 1, wherein the solid electrolyte is an oxide solid electrolyte or a sulfide solid electrolyte.

19. The all-solid secondary battery of claim 18, wherein the oxide-based solid electrolyte is at least one of $Li_{1+x+y}$ $Al_xTi_{2-x}Si_yP_{3-y}O_{12}$ wherein $0<x<2$ and $0\leq y<3$, $BaTiO_3$, $Pb(Zr_xTi_{1-x})O_3$ wherein $0\leq x\leq 1$, $Pb_{1-x}La_xZr_{1-y}Ti_yO_3$ wherein $0\leq x<1$ and $0\leq y<1$), $Pb(Mg_{1/3}Nb_{2/3})$ $O_3$—$PbTiO_3$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ wherein $0<x<2$ and $0<y<3$, $Li_xAl_yTi_z(PO_4)_3$ wherein $0<x<2$, $0<y<1$, and $0<z<3$, $Li_{1+x+y}(Al_aGa_{1-a})_x(Ti_bGe_{1-b})_{2-x}Si_yP_{3-y}$ $O_{12}$ wherein $0\leq x\leq 1$, $0\leq y\leq 1$, $0\leq a\leq 1$, and $0\leq b\leq 1$, $Li_xLa_yTiO_3$ wherein $0<x<2$ and $0<y<3$, $Li_2O$, $LiOH$, $Li_2CO_3$, $LiAlO_2$, $Li_2O$—$Al_2O_3$—$SiO_2$—$P_2O_5$—$TiO_2$—$GeO_2$, or $Li_{3+x}$ $La_3M_2O_{12}$ wherein M is Te, Nb, or Zr, and x is an integer from 1 to 10.

20. The all-solid secondary battery of claim 18, wherein the oxide solid electrolyte comprises at least one of $Li_7La_3Zr_2O_{12}$ or $Li_{3+x}La_3Zr_{2-a}M_aO_{12}$, wherein M is Ga, W, Nb, Ta, or Al, and x is an integer from 1 to 10 and $0\leq a<2$.

21. The all-solid secondary battery of claim 18, wherein the sulfide solid electrolyte comprises at least one of $Li_2S$—$P_2S_5$, $Li_2S$—$P_2S_5$—$LiX$ wherein X is a halogen, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ wherein m and n are each independently a positive number, and Z is Ge, Zn, or Ga, $Li_2S$—$GeS_2$, $Li_2S$—$SiS_2$—$Li_3PO_4$, $Li_2S$—$SiS_2$—$Li_pMO_q$ wherein p and q are each independently a positive number, and M is at least one of P, Si, Ge, B, Al, Ga, or In, $Li_{7-x}PS_{6-x}Cl_x$ wherein $0\leq x\leq 2$, $Li_{7-x}PS_{6-x}Br_x$ wherein $0\leq x\leq 2$, or $Li_{7-x}PS_{6-x}I_x$ wherein $0\leq x\leq 2$.

22. The all-solid secondary battery of claim 18, wherein the sulfide solid electrolyte comprises an argyrodite-type solid electrolyte, and the argyrodite-type solid electrolyte comprises at least one of $Li_{7-x}PS_{6-x}Cl_x$ wherein $0\leq x\leq 2$, $Li_{7-x}PS_{6-x}Br_x$ wherein $0\leq x\leq 2$, or $Li_{7-x}PS_{6-x}I_x$ wherein $0\leq x\leq 2$.

23. An all-solid secondary battery comprising:

a cathode layer comprising a cathode active material;

an anode layer; and a solid electrolyte layer comprising a solid electrolyte and disposed between the cathode layer and the anode layer, wherein the anode layer comprises an anode current collector, a first anode active material layer in contact with the solid electrolyte layer, and a second anode active material layer disposed between the anode current collector and the first anode active material layer, a third anode active material layer disposed between the anode current collector and the solid electrolyte layer, wherein the third anode active material layer comprises lithium or a lithium alloy, wherein the first anode active material layer comprises a first metal, and the first metal has a lithium-ion reduction potential greater than a reduction potential of the solid electrolyte, and wherein the second anode active material layer comprises a second metal, and a solid solubility of lithium in the second metal is greater than a solid solubility of lithium in the first metal, wherein the third anode active material layer is a plated layer, wherein the first metal comprises indium, wherein the second metal comprises at least one of silver, gold, platinum, palladium, silicon, aluminum, bismuth, magnesium, tin, or zinc, wherein a lithium ion diffusivity at 25° C. of the first anode active material layer is equal to or greater than a lithium ion diffusivity at 25° C. of the second anode active material layer, and the first anode active material layer has a lithium ion diffusivity at 25° C. of about $1×10^{-16}$ square centimeters per second to about $1×10^{-3}$ square centimeters per second.

24. An all-solid secondary battery of claim 23, wherein the third anode active material layer consist of lithium.

25. An all-solid secondary battery of claim 23, wherein the third anode active material layer is disposed between the anode current collector and the second anode active material layer, or between the first anode active material layer and the second anode active material layer, or between the solid electrolyte layer and the first anode active material layer.

26. A method of manufacturing an all-solid secondary battery comprising:

providing a solid electrolyte layer;

disposing a first anode active material layer on a surface of the solid electrolyte layer, wherein the first anode active material layer comprises a first metal;

disposing a second anode active material layer on the first anode active material layer, wherein the second anode active material layer comprises a second metal; and disposing a cathode active material layer on a surface of the solid electrolyte layer opposite the first anode active material layer to manufacture the all-solid secondary battery wherein the first metal has a lithium-ion reduction potential greater than a reduction potential of the solid electrolyte, and wherein a solid solubility of lithium in the second metal is greater than a solid solubility of lithium in the first metal, wherein the first metal comprises indium, wherein the second metal comprises at least one of silver, gold, platinum, palladium, silicon, aluminum, bismuth, magnesium, tin, or zinc, wherein a lithium ion diffusivity at 25° C. of the first anode active material layer is equal to or greater than a lithium ion diffusivity at 25° C. of the second anode active material layer, and the first anode active material layer has a lithium ion diffusivity at 25° C. of about $1×10^{-16}$ square centimeters per second to about $1×10^{-3}$ square centimeters per second.

27. A method of manufacturing an all-solid secondary battery comprising:

providing a solid electrolyte layer;

disposing a first anode active material layer on a surface of the solid electrolyte layer, wherein the first anode active material layer comprises a first metal;

disposing a second anode active material layer on the first anode active material layer, wherein the second anode active material layer comprises a second metal;

disposing a cathode active material layer on a surface of the solid electrolyte layer opposite the first anode active material layer;

plating a third anode active material layer by charging between the solid electrolyte layer and the first anode active material layer, or between the first anode active material layer and the second anode active material layer, or on a surface of the second anode active material layer not contacting the first anode active material to manufacture the all-solid secondary battery, wherein the first metal has a lithium-ion reduction potential greater than a reduction potential of the solid electrolyte, and wherein a solid solubility of lithium in the second metal is greater than a solid solubility of lithium in the first metal, wherein the first metal comprises indium, wherein the second metal comprises at least one of silver, gold, platinum, palladium, silicon, aluminum, bismuth, magnesium, tin, or zinc, wherein a lithium ion diffusivity at 25° C. of the first anode active material layer is equal to or greater than a lithium ion diffusivity at 25° C. of the second anode active material layer, and the first anode active material layer has a lithium ion diffusivity at 25° C. of about $1×10^{-16}$ square centimeters per second to about $1×10^{-3}$ square centimeters per second.

28. A protected electrode comprising:

a current collector;

a first layer;

a second layer disposed between the current collector and the first layer; and a solid electrolyte, wherein the first layer comprises a first metal, and the first metal has a lithium-ion reduction potential greater than a reduction potential of the solid electrolyte, and wherein the second layer comprises a second metal, and a solid solubility of lithium in the second metal is greater than a solid solubility of lithium in the first metal, wherein the first metal comprises indium, wherein the second metal comprises at least one of silver, gold, platinum, palladium, silicon, aluminum, bismuth, magnesium, tin, or zinc, wherein a lithium ion diffusivity at 25° C. of the first anode active material layer is equal to or greater than a lithium ion diffusivity at 25° C. of the second anode active material layer, and the first anode active material layer has a lithium ion diffusivity at 25° C. of about $1×10^{-16}$ square centimeters per second to about $1×10^{-3}$ square centimeters per second.

29. The protected electrode of claim 28, further comprising lithium in the second layer.

* * * * *